United States Patent [19]
Okumura et al.

[11] Patent Number: 5,926,823
[45] Date of Patent: Jul. 20, 1999

[54] DOCUMENT GENERIC LOGICAL INFORMATION EDITING APPARATUS

[75] Inventors: Yo Okumura; Hisashi Nakatsuyama; Go Uchida, all of Yokohama, Japan

[73] Assignee: Fuji Xerox Co., Ltd., Tokyo, Japan

[21] Appl. No.: 08/543,329

[22] Filed: Oct. 16, 1995

[30] Foreign Application Priority Data

Nov. 10, 1994 [JP] Japan ................................ 6-300155

[51] Int. Cl.$^6$ ................................................ G06F 17/21
[52] U.S. Cl. ............................................................. 707/514
[58] Field of Search .................................. 395/761, 774, 395/779, 793, 792, 776; 707/513, 514

[56] References Cited

U.S. PATENT DOCUMENTS

| | | | |
|---|---|---|---|
| 5,323,312 | 6/1994 | Saito et al. ................................ | 707/513 |
| 5,434,962 | 7/1995 | Kyojima et al. ........................... | 707/513 |
| 5,499,331 | 3/1996 | Hayashi et al. ........................... | 707/513 |
| 5,557,720 | 9/1996 | Brown, Jr. et al. ....................... | 707/513 |
| 5,557,722 | 9/1996 | DeRose et al. ........................... | 707/513 |
| 5,568,640 | 10/1996 | Nishiyama et al. ................. | 707/531 X |
| 5,633,996 | 5/1997 | Hayashi et al. ........................... | 707/513 |

OTHER PUBLICATIONS

Document Editing and Entry Based on the Standardized Office Document Architecture, Esprit '86: Results and Achievements, Kronert et al., pp. 107–126, 1986.

A New Method of Document Structure Extraction using Generic Layout Knowledge, International Workshop on Industrial Applications of Machine Intelligence and Vision (MIV–89), Yashiro et al., pp. 282–287, Apr. 1989.

Introducing ODA, Computer Standards & Interfaces, Ian Campbell–Grant, vol. 11, No. 3, Mar. 1991, pp. 149–156.

Standards for Structured Documents, The Computer Journal, vol. 32, No. 6, 1989, Heather Brown, pp. 505–514.

*Primary Examiner*—Anton Fetting
*Attorney, Agent, or Firm*—Oliff & Berridge, PLC

[57] ABSTRACT

A document editing apparatus edits document generic logical information in accordance with a set of restrictions. The document generic logical information defines a document generic logical structure. The restrictions are applied to the document generic logical information to ensure that any logical unit of a document having a logical structure consistent with document generic logical structure, can be extracted as a tree structure. The apparatus includes an editing device for editing the document generic logical information, and a judging device for judging whether the document generic logical information meets the restrictions.

13 Claims, 23 Drawing Sheets

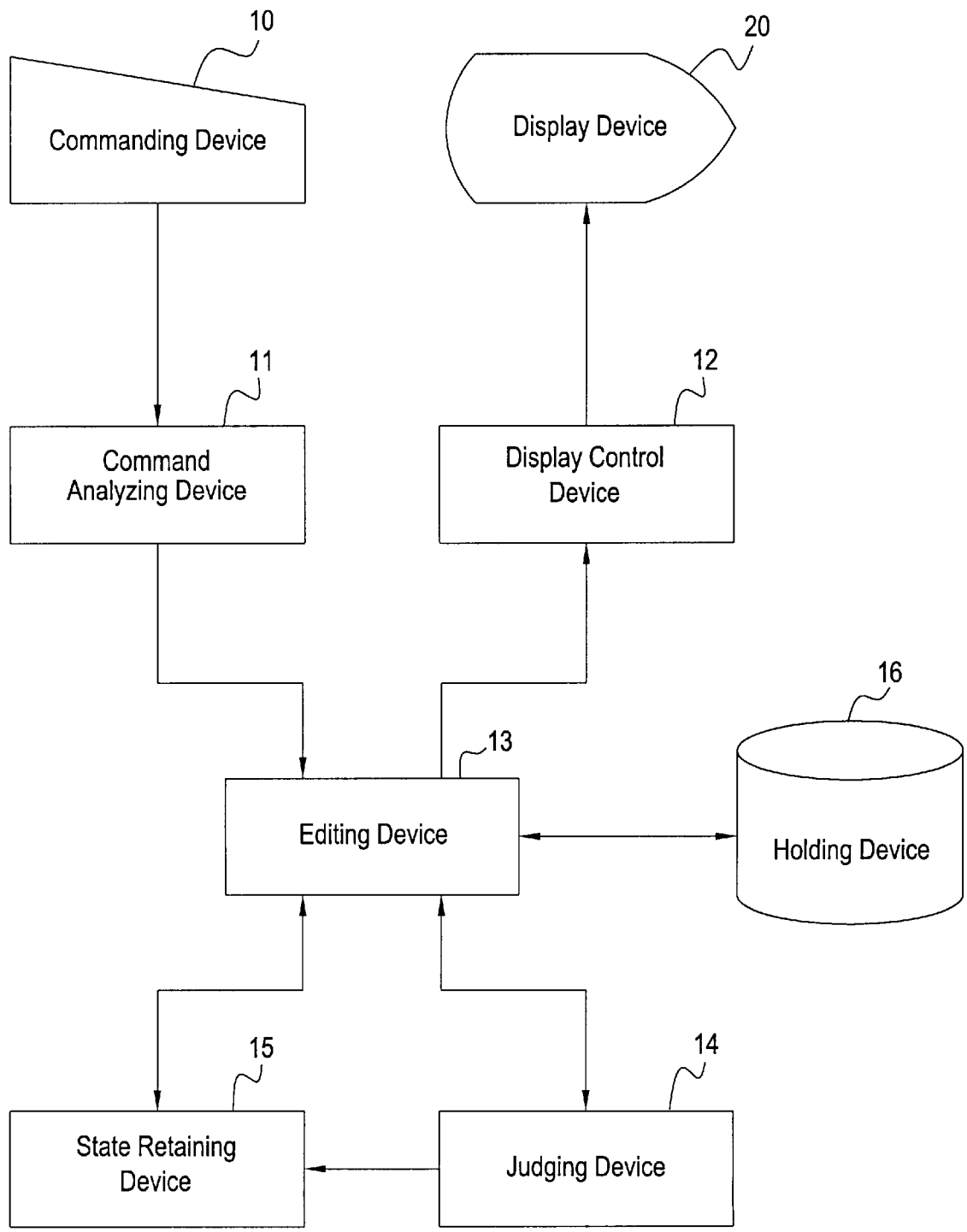
FIG. 1 Basic Configuration of the Document Generic Logical Information Editing Apparatus

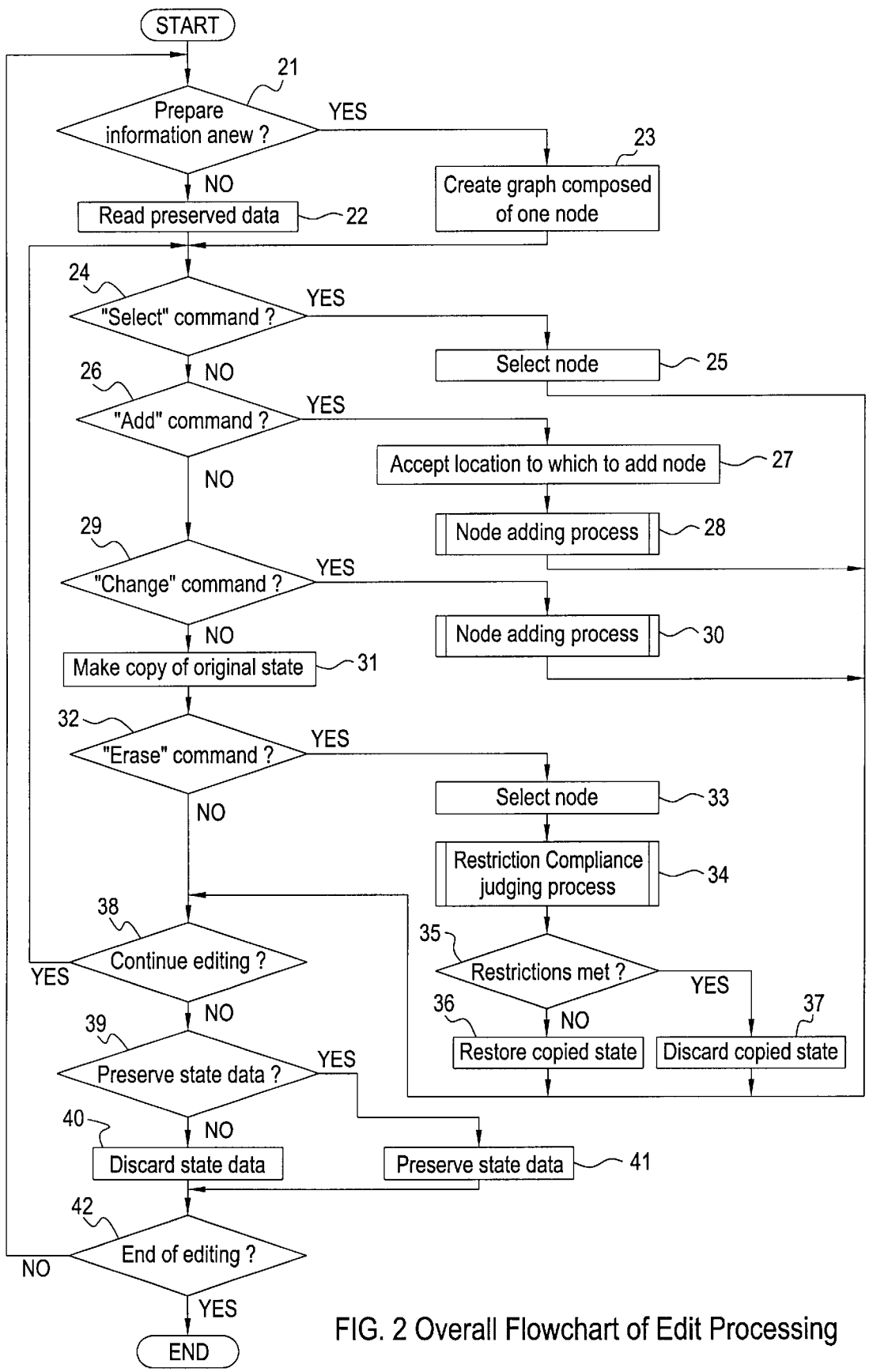
FIG. 2 Overall Flowchart of Edit Processing

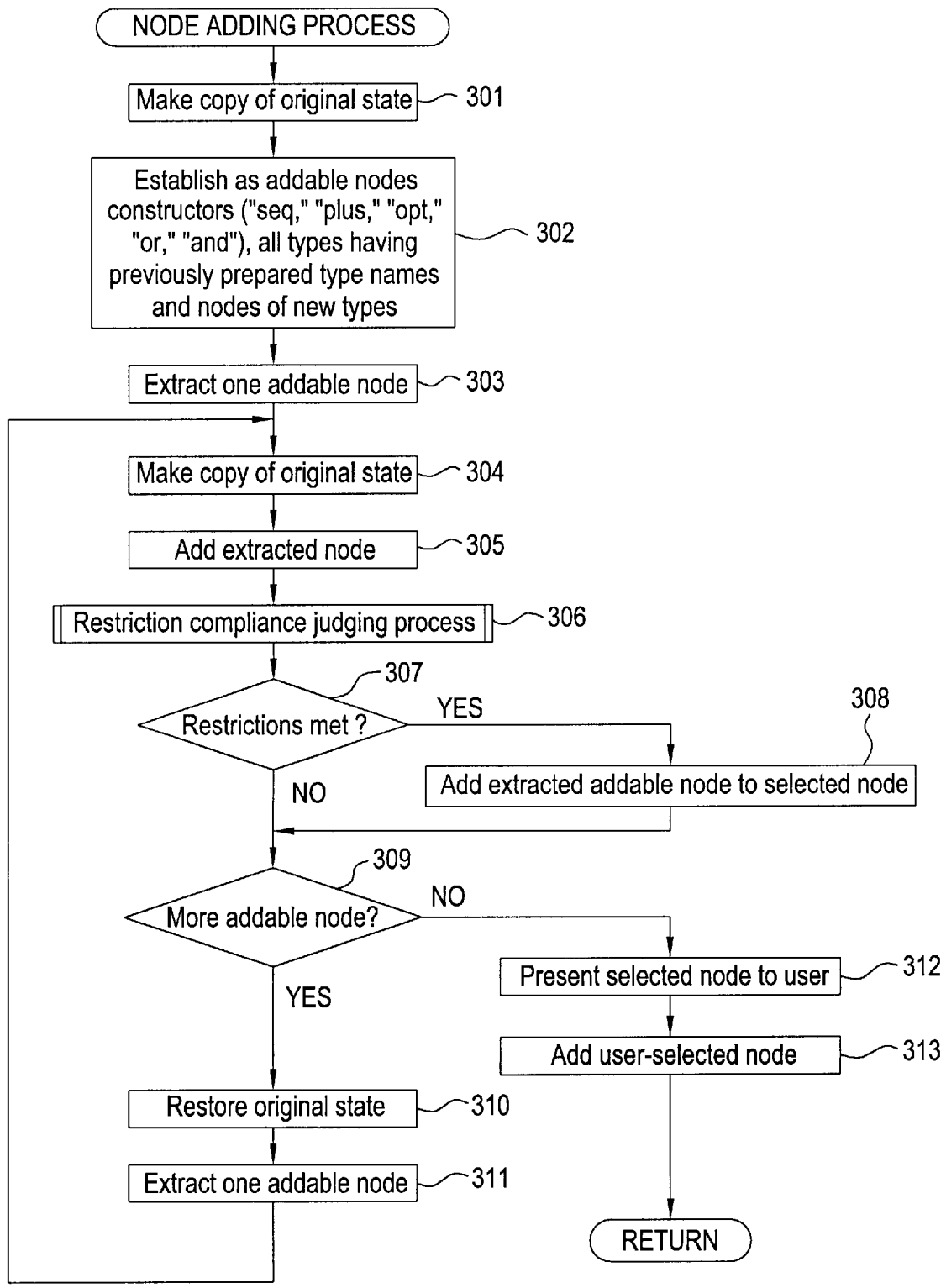
FIG. 3 Flowchart of the Node Adding Process

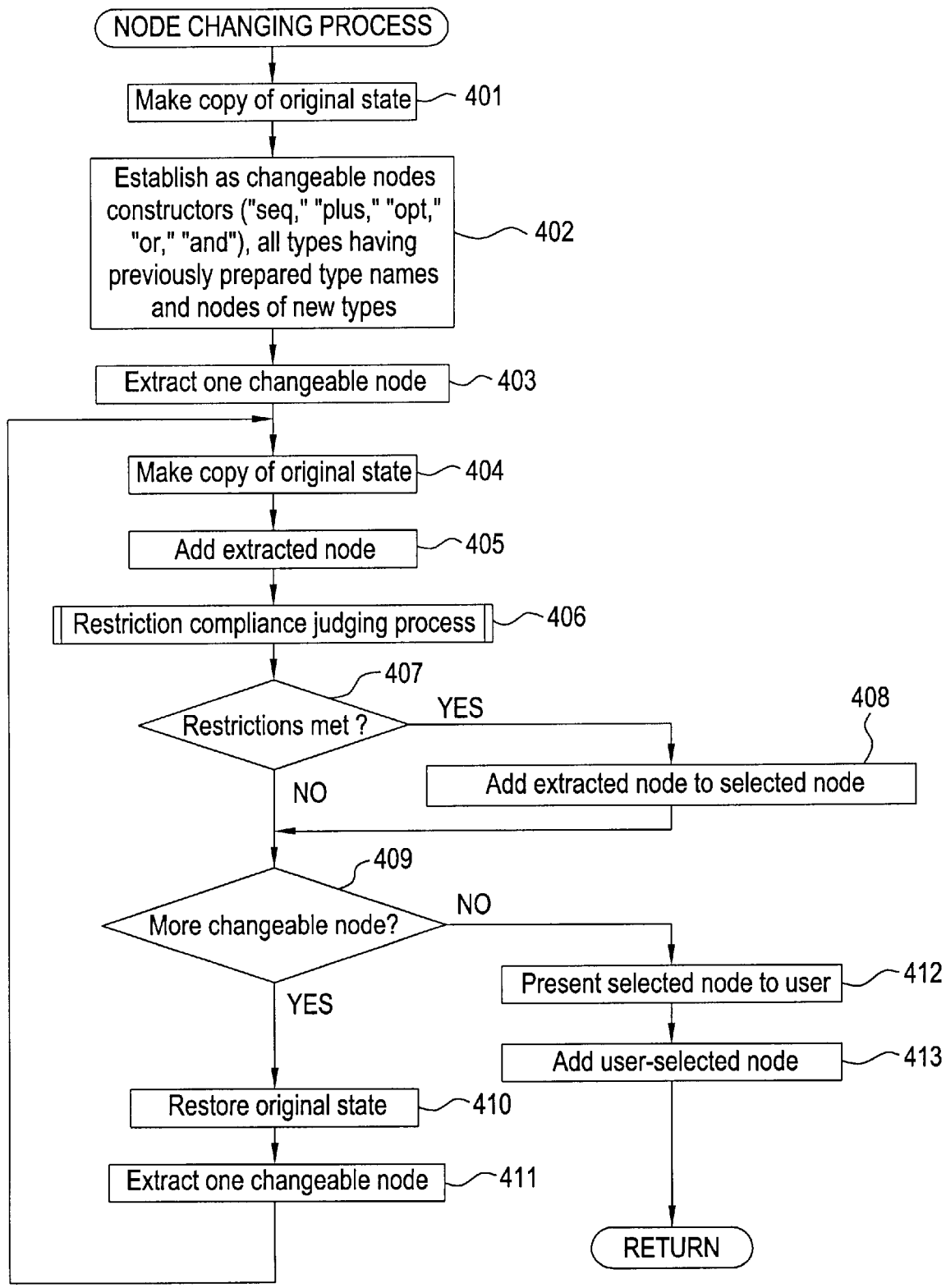
FIG. 4 Flowchart of the Node Changing Process

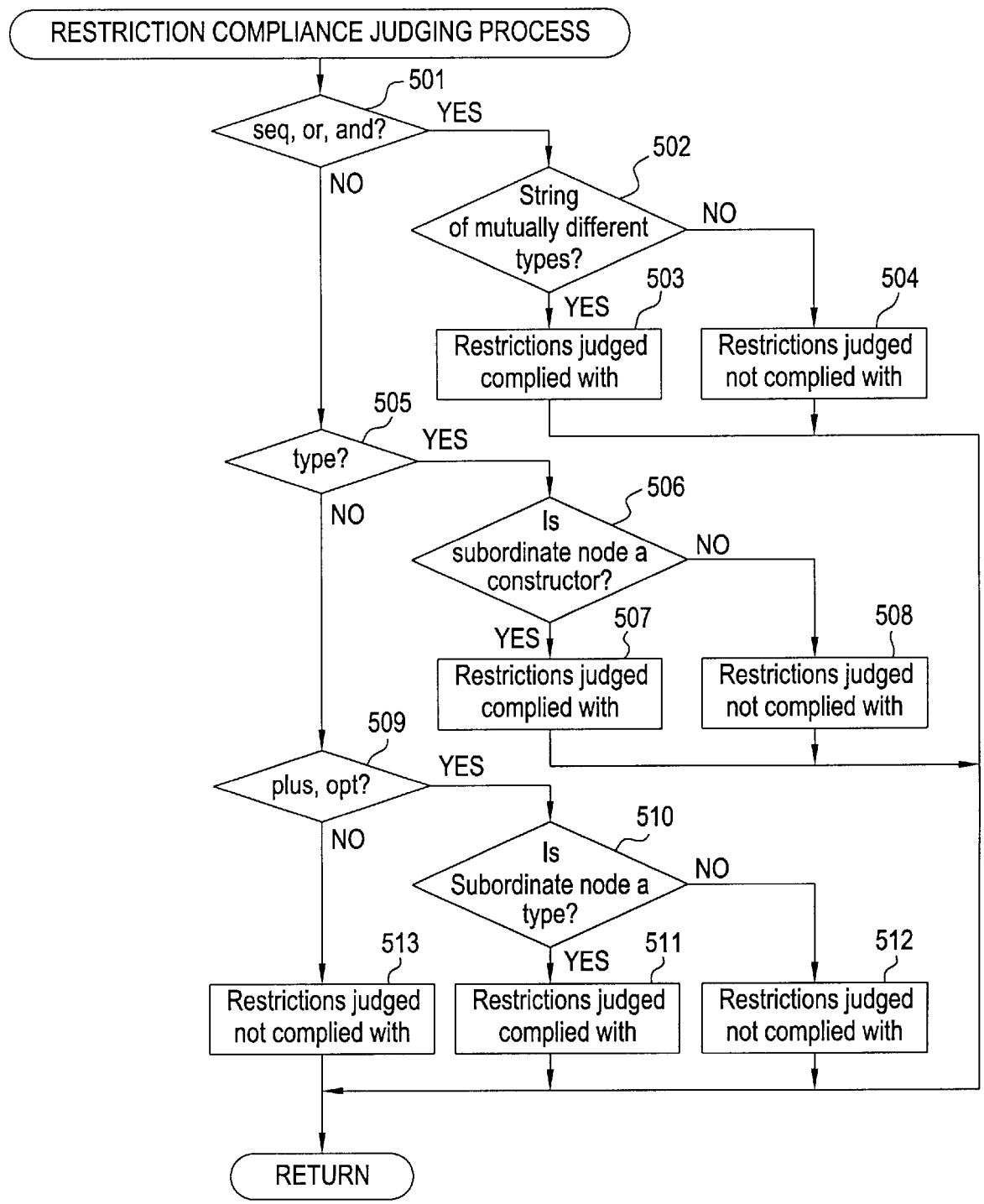
FIG. 5  Flowchart of the Restriction Compliance Judging Process

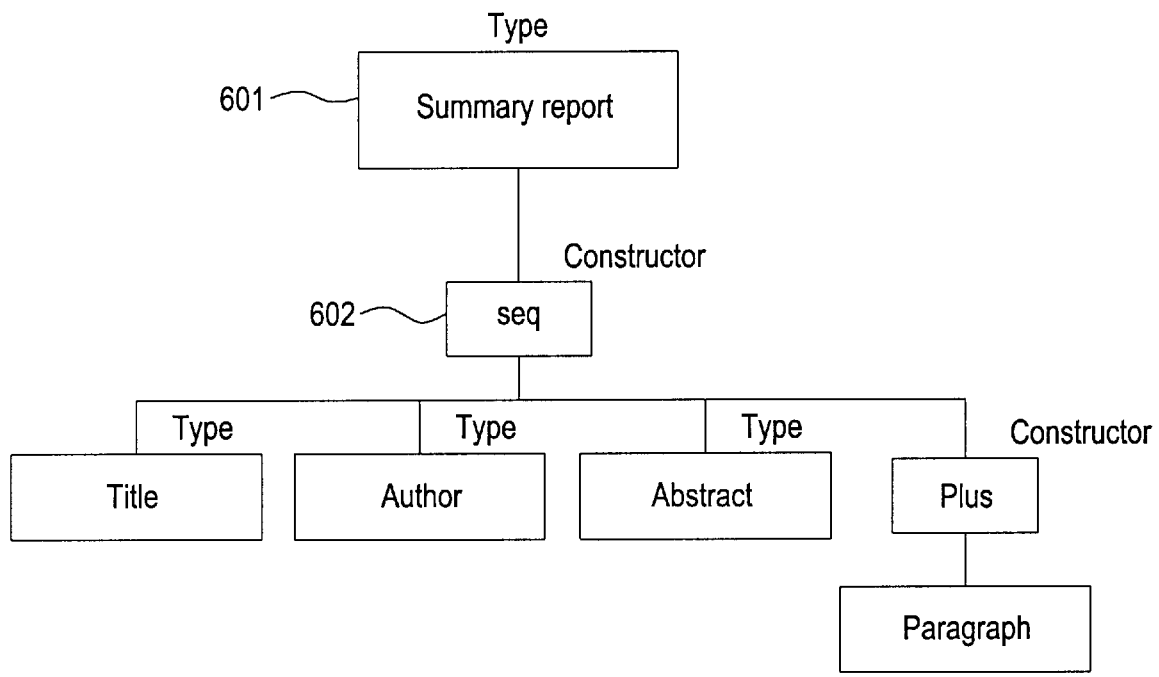
FIG. 6 Typical Graph Structure Comprising Types and Constructors

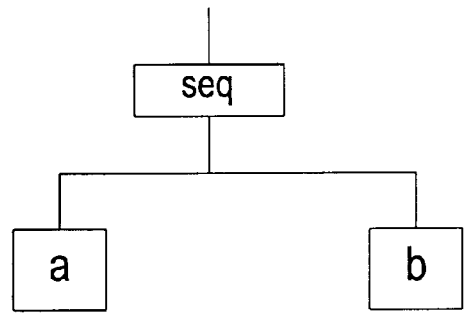
FIG. 7 Structure from which Set of Nodes Subordinate to "seq" May Be Extracted
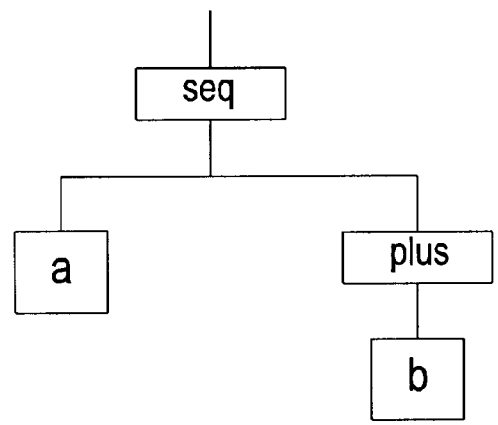
FIG. 8 Structure from which Set of Nodes Subordinate to "seq" May Be Not Extracted

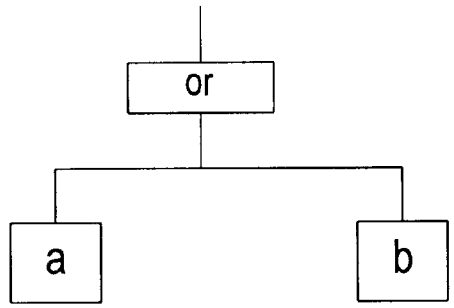
FIG. 9 Structure from which Set of Nodes Subordinate to "or" May Be Extracted
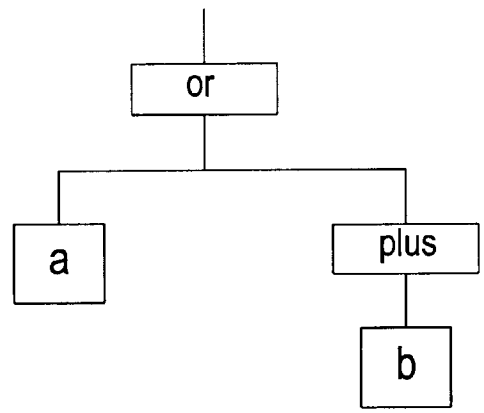
FIG. 10 Structure from which Set of Nodes Subordinate to "or" May Be Not Extracted

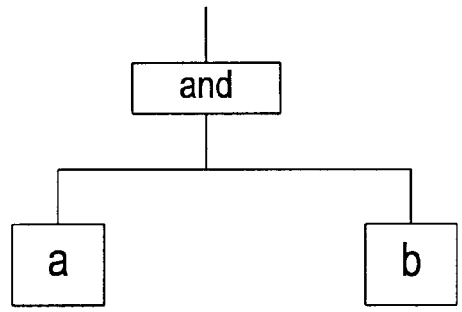
FIG. 11 Structure from which Set of Nodes Subordinate to "and" May Be Extracted
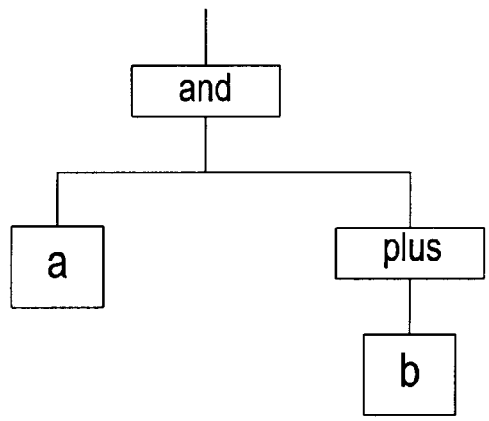
FIG. 12 Structure from which Set of Nodes Subordinate to "and" May Be Not Extracted

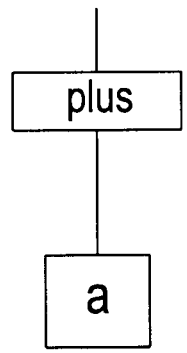
FIG. 13 Structure from which Node Subordinate to "plus" May Be Extracted
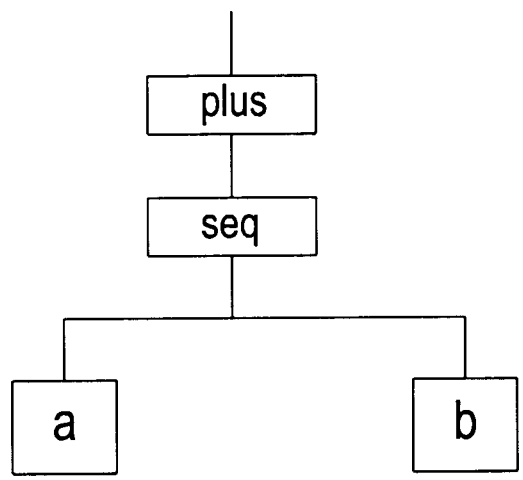
FIG. 14 Structure from which Node Subordinate to "plus" May Be Not Extracted

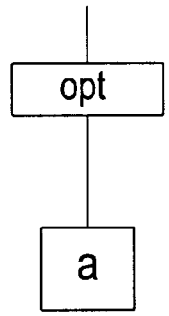
FIG. 15 Structure from which Node Subordinate to "opt" May Be Extracted
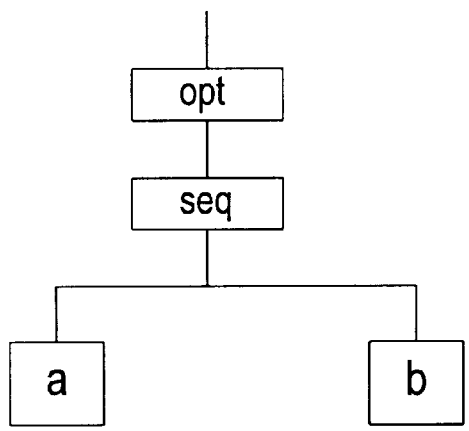
FIG. 16 Structure from which Set of Nodes Subordinate to "opt" May Be Not Extracted

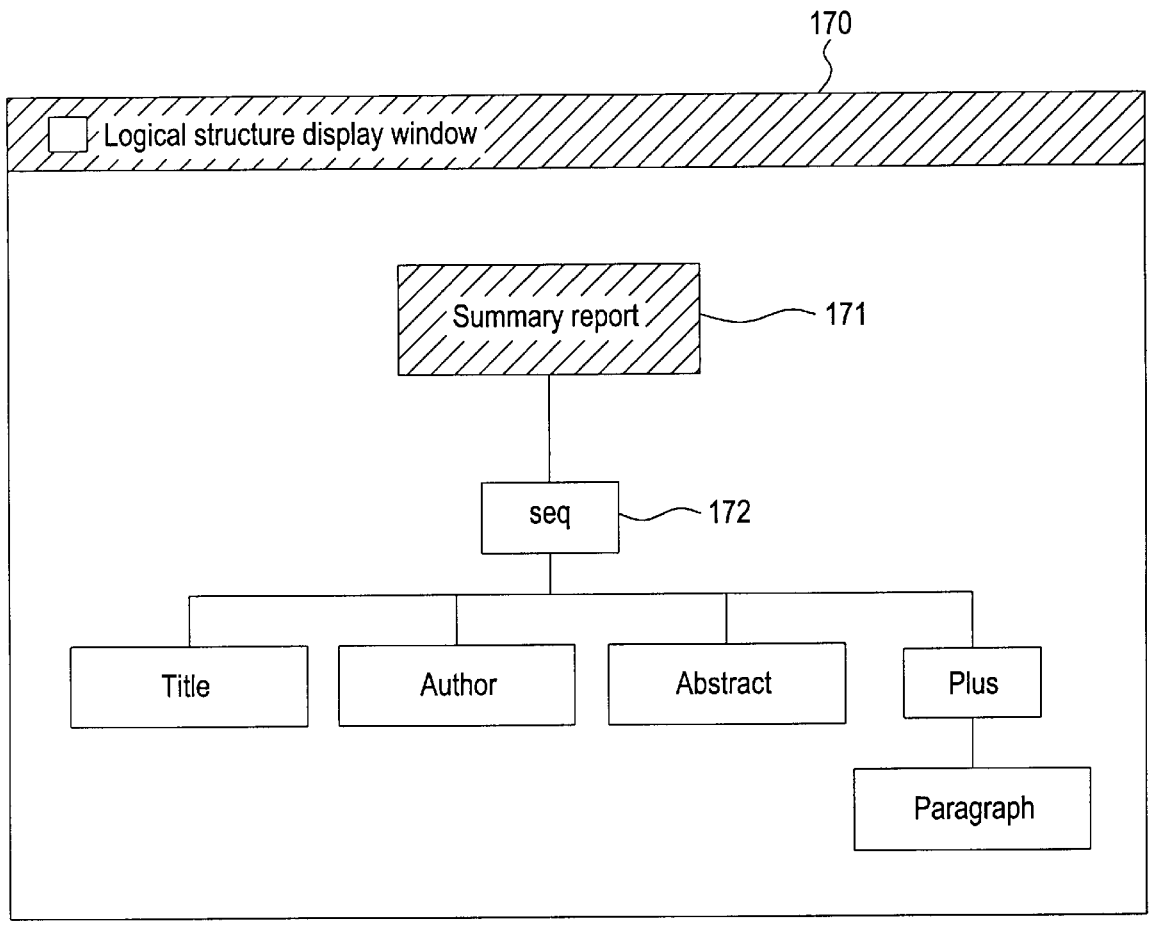
FIG. 17 Window for Displaying Logical Structure of Document
Generic Logical Information

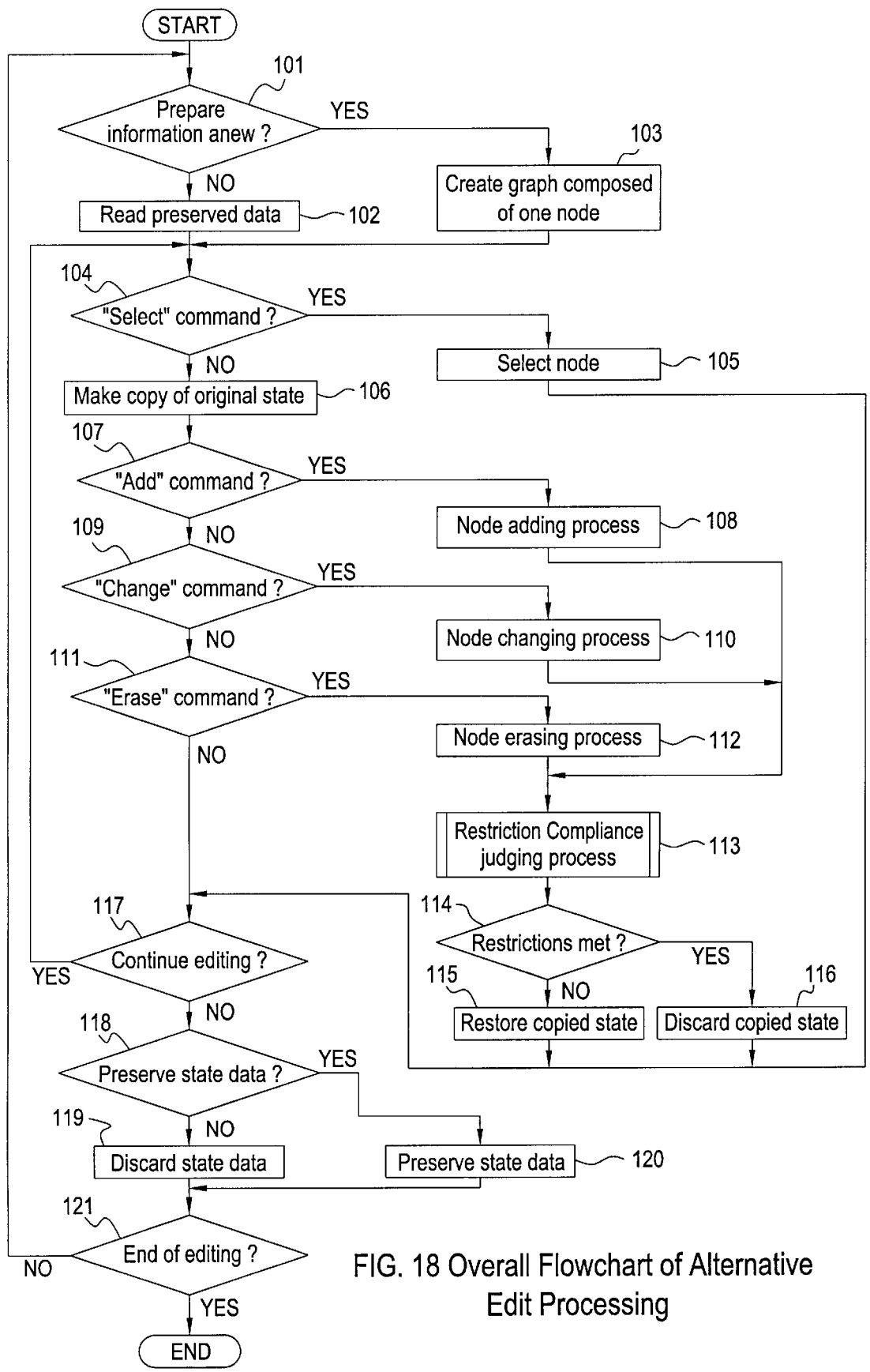
FIG. 18 Overall Flowchart of Alternative Edit Processing

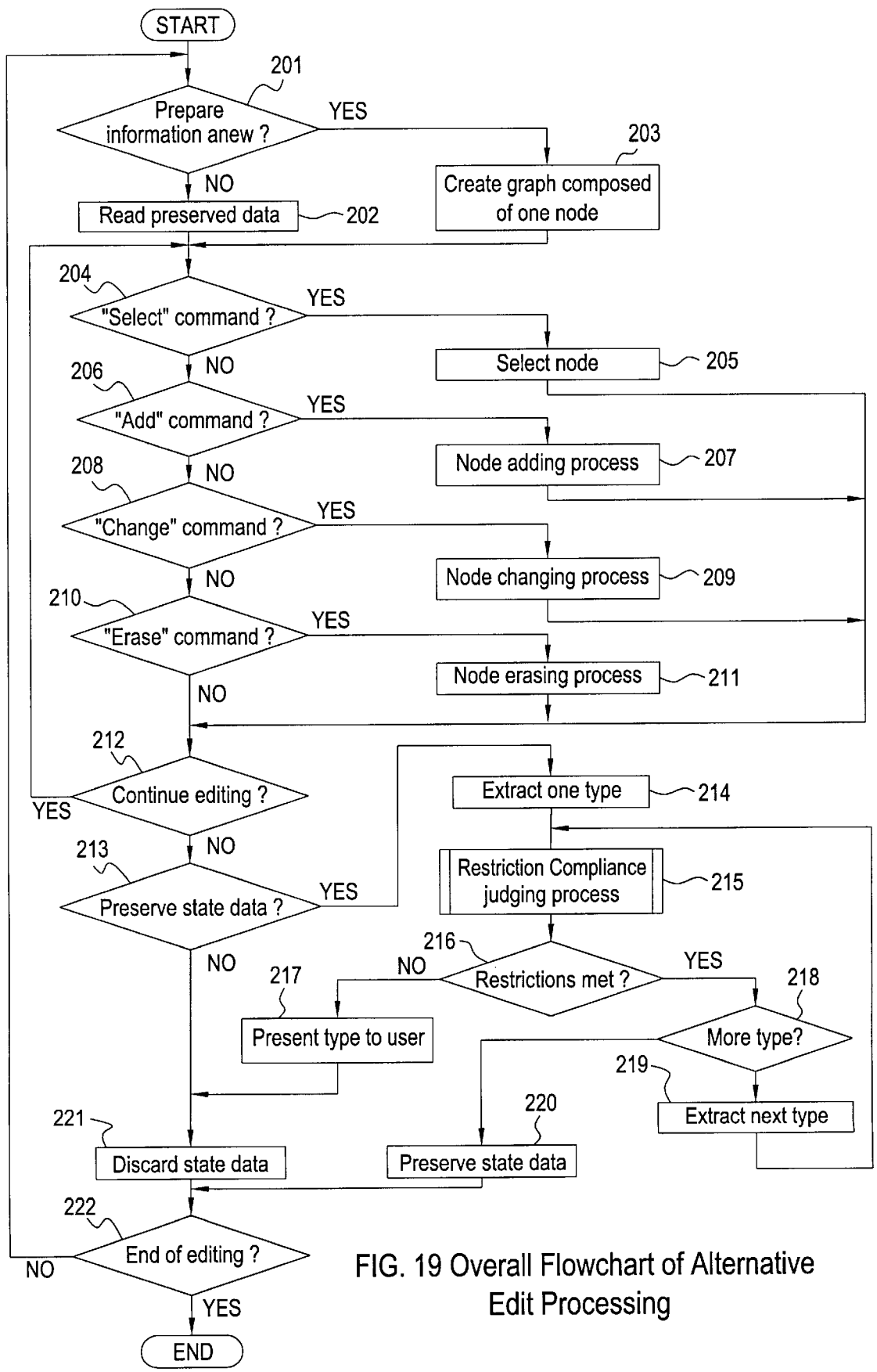
FIG. 19 Overall Flowchart of Alternative Edit Processing

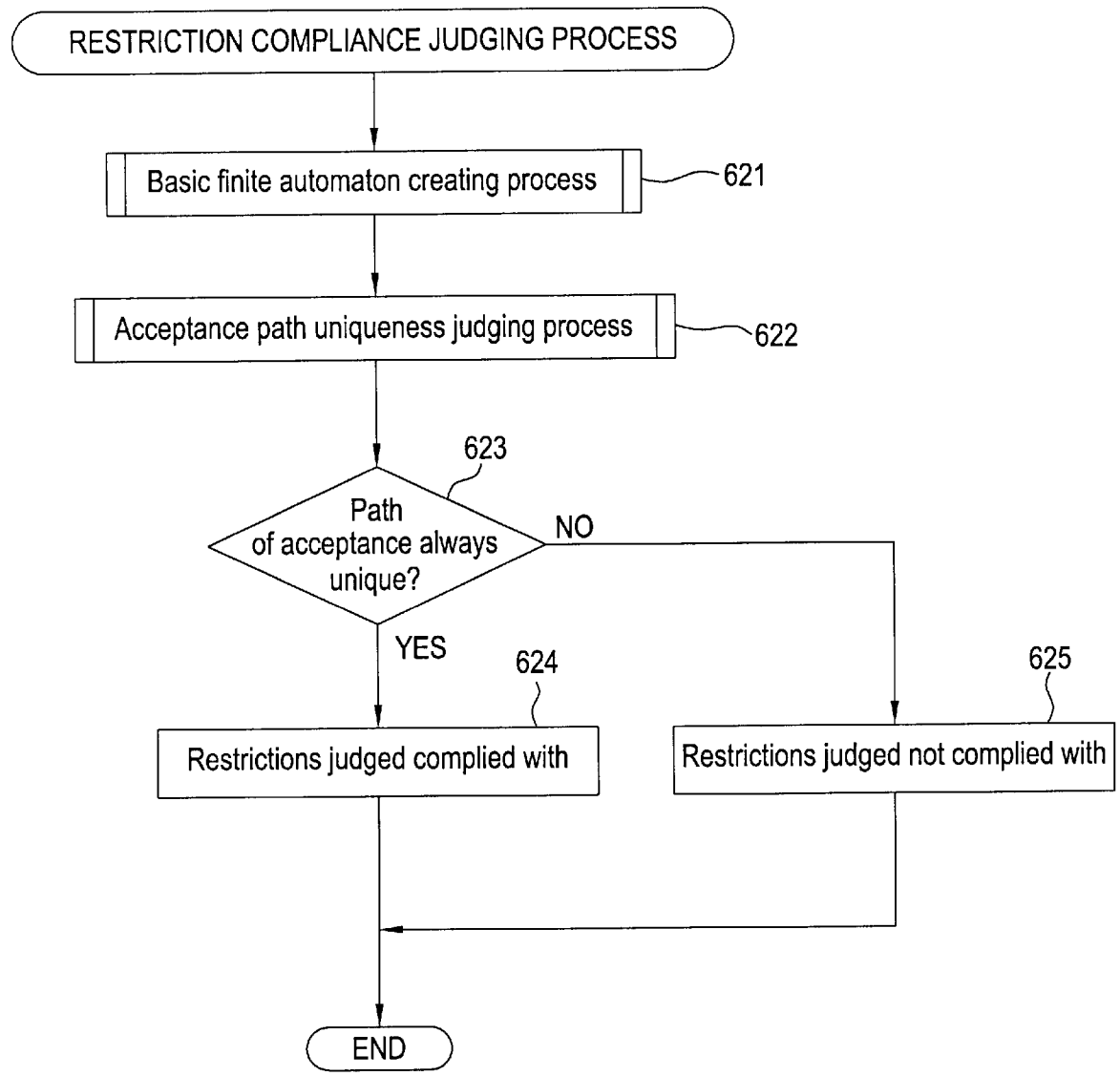
FIG. 20 Flowchart of an Alternative Restriction Compliance Judging Process

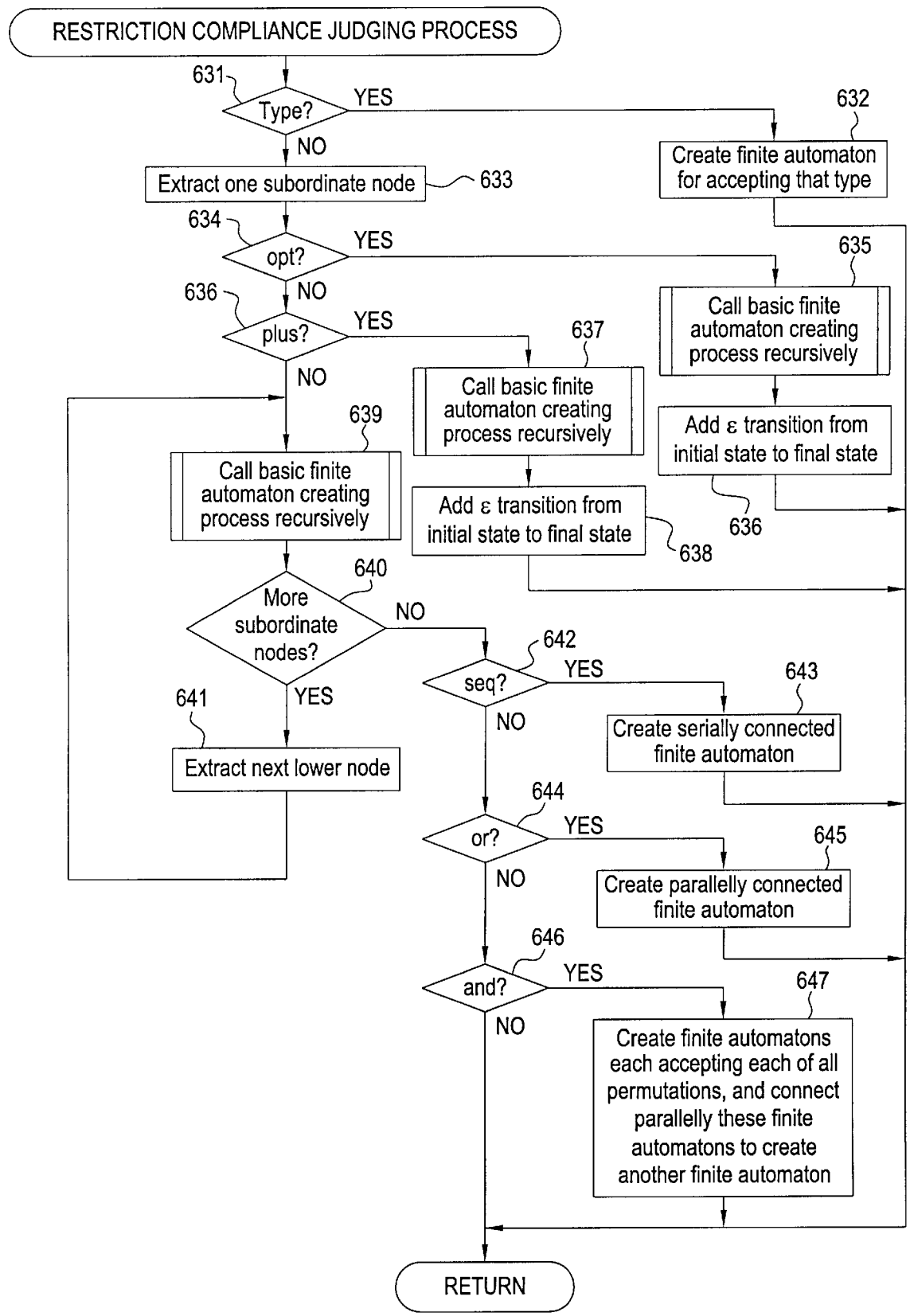
FIG. 21 Basic Finite Automaton Creating Process

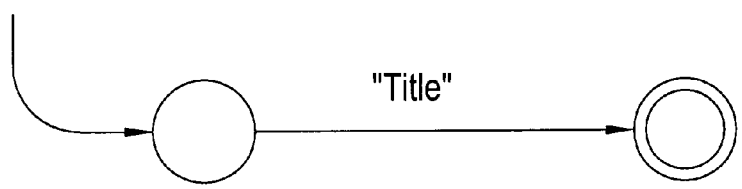
FIG. 22 Structure of Finite Automaton for Accepting Type
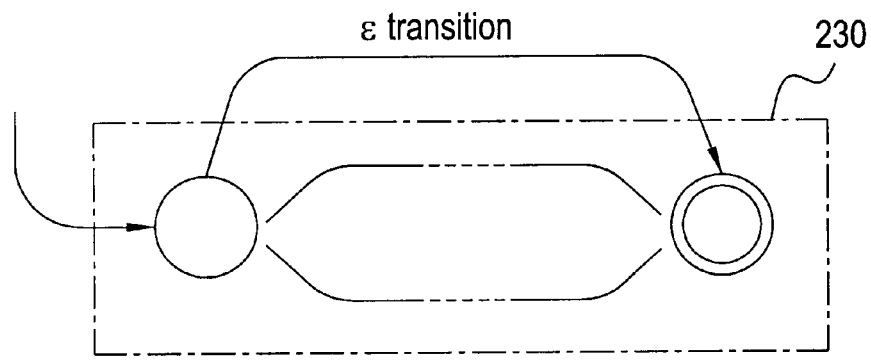
FIG. 23 Structure of Finite Automaton for Accepting "opt(X)"
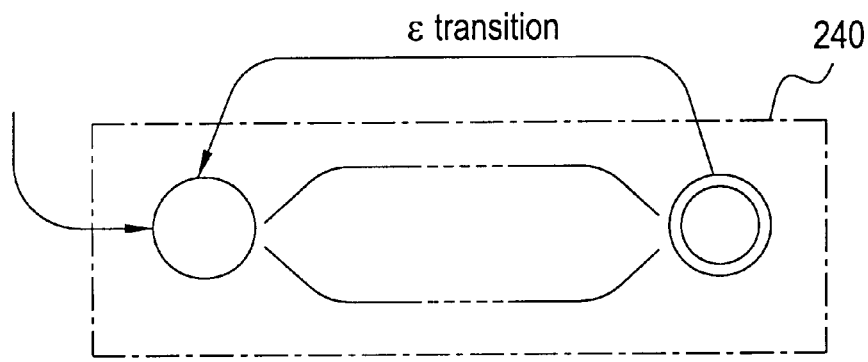
FIG. 24 Structure of Finite Automaton for Accepting "plus(X)"

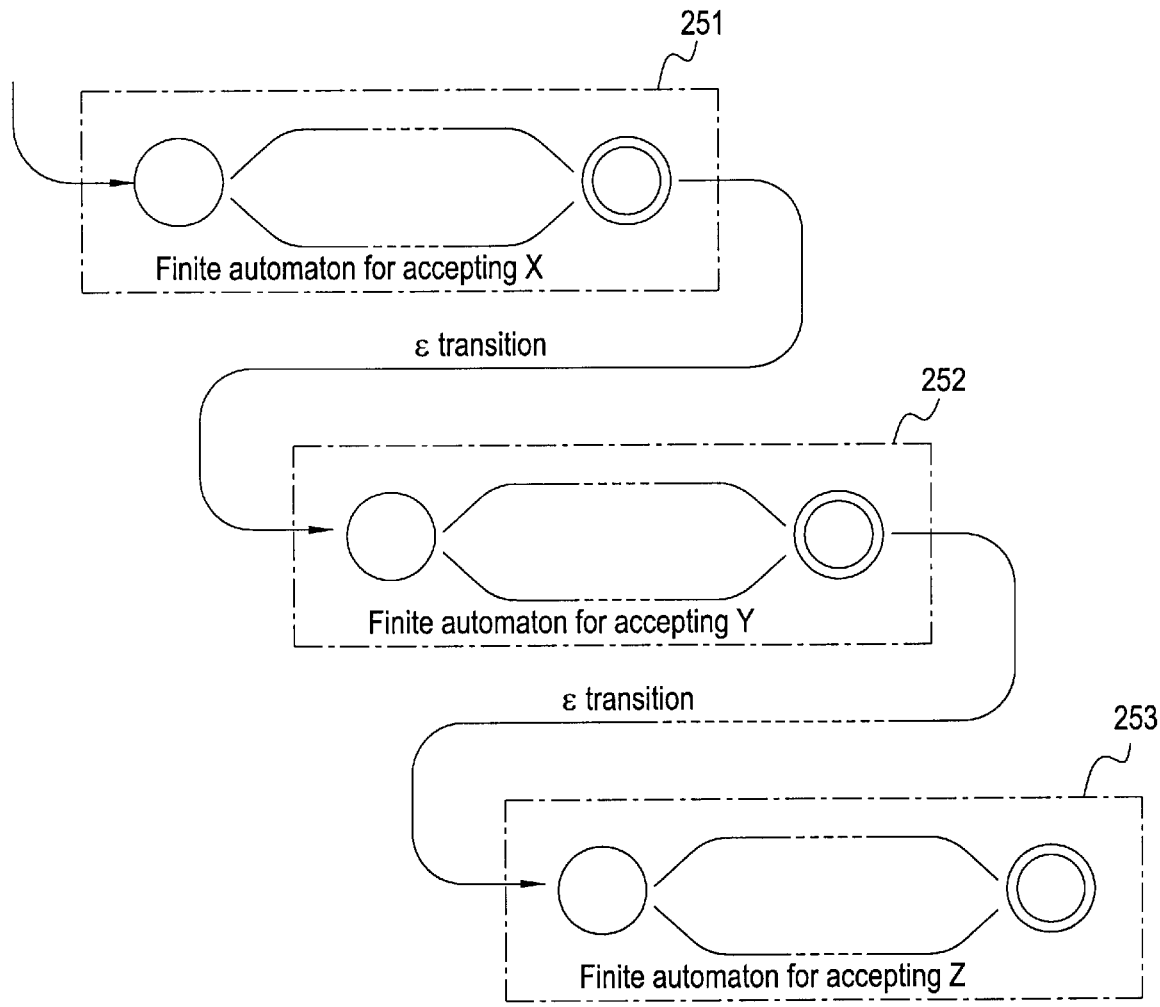
FIG. 25 Structure of Finite Automaton for Accepting "seq(X, Y,..., Z)"

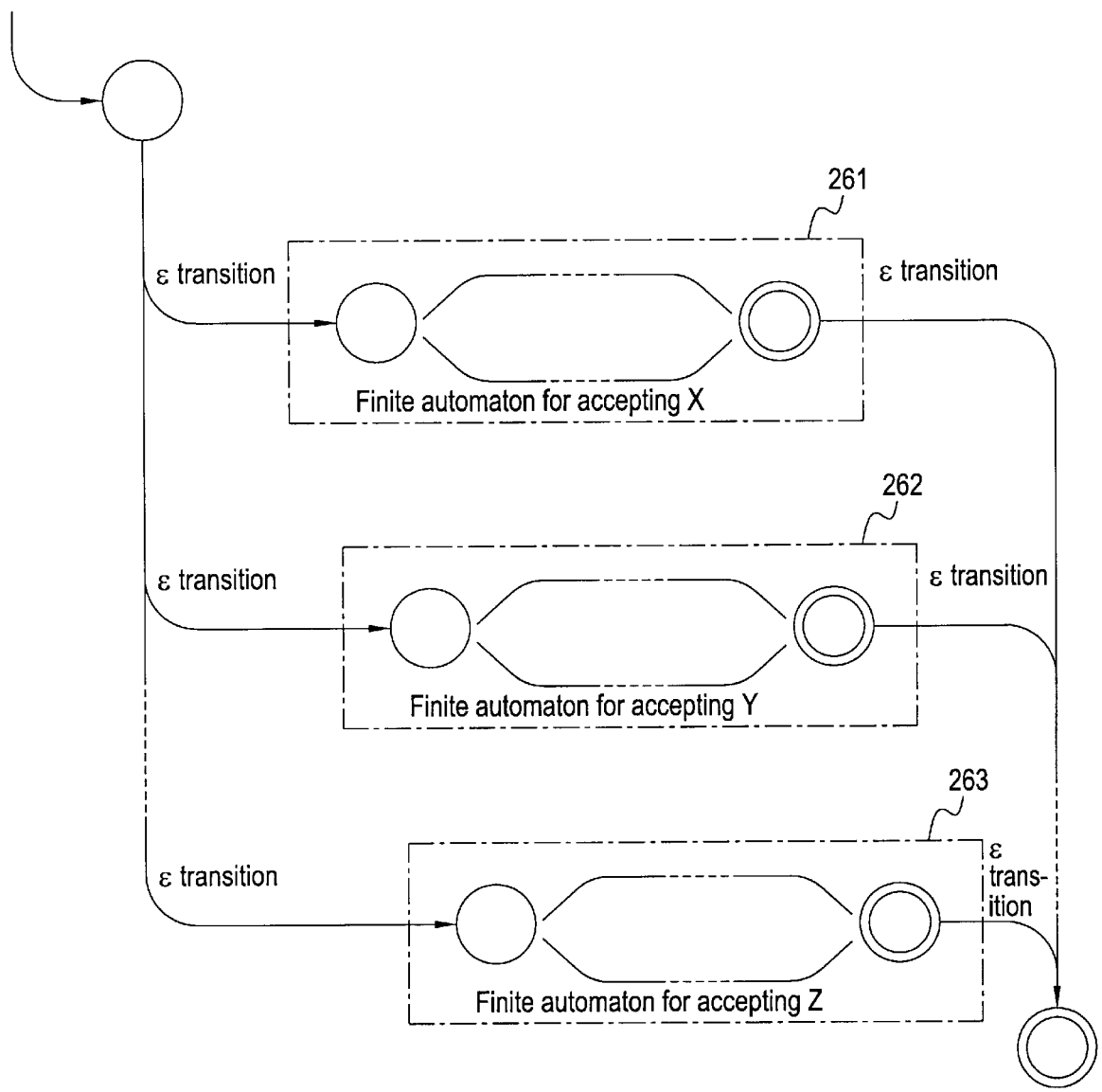
FIG. 26 Structure of Finite Automatons for Accepting "or(X, Y,..., Z)"

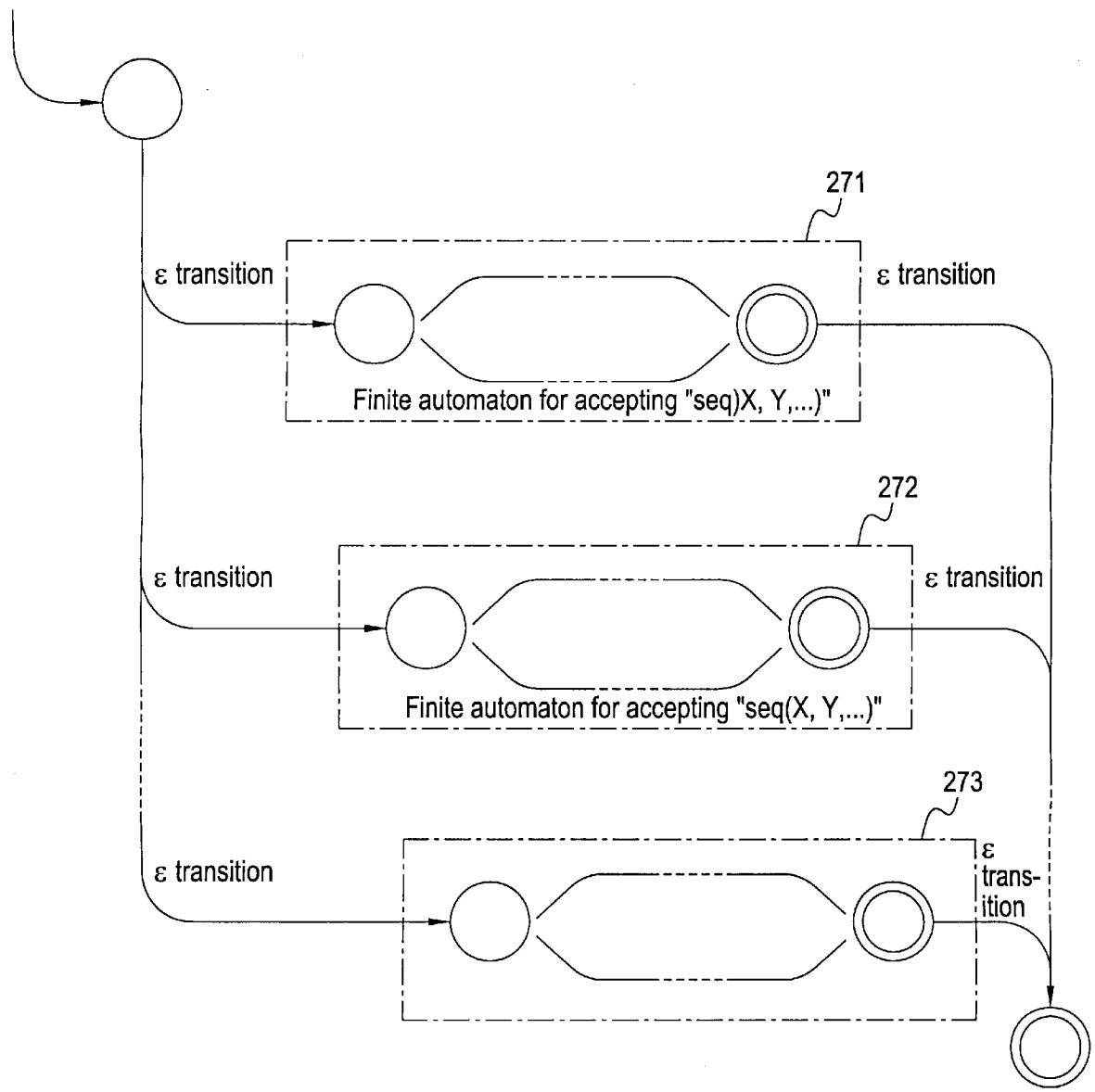
FIG. 27 Structure of Finite Automatons for Accepting "and(X, Y,..., Z)"

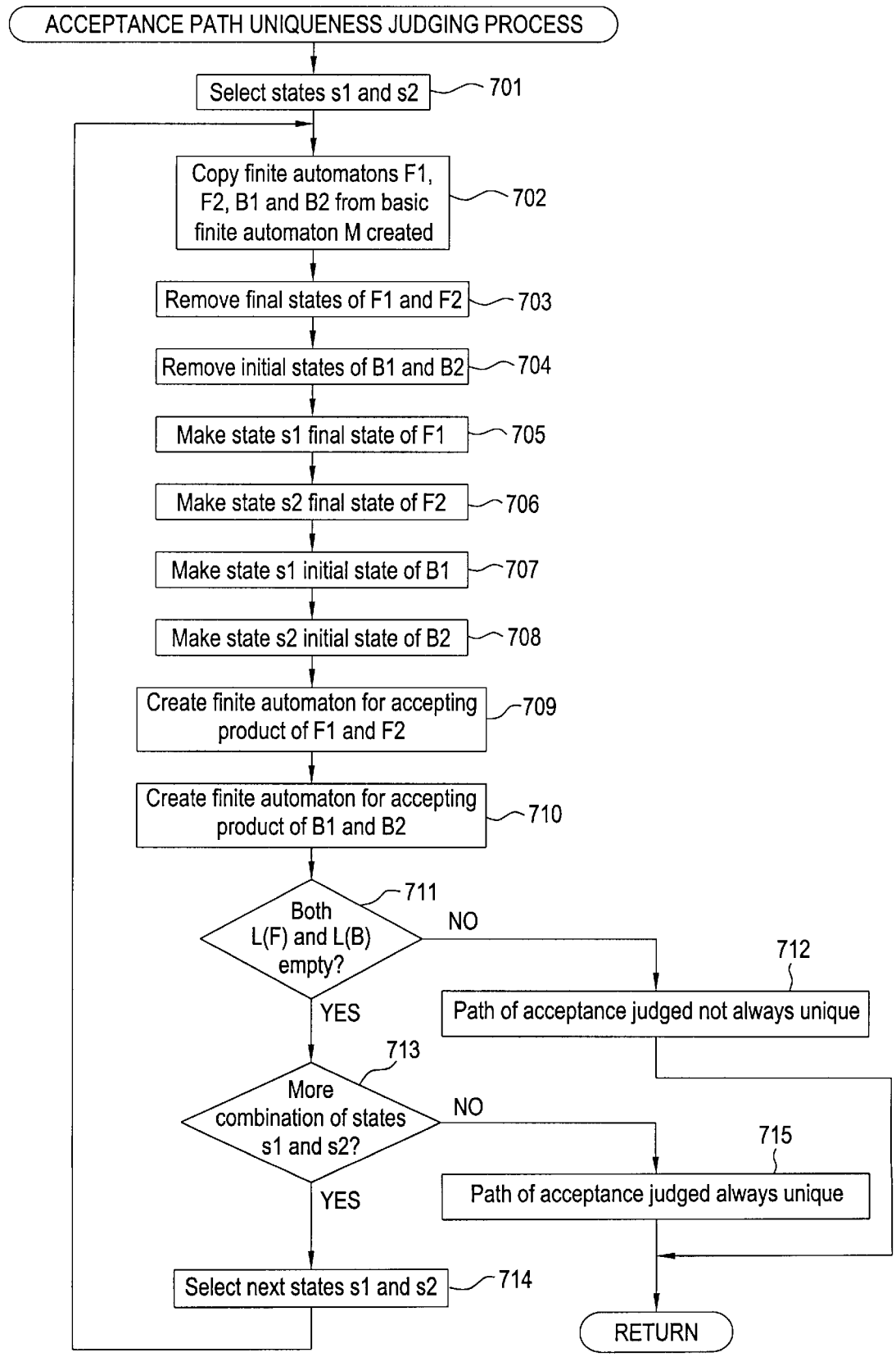
FIG. 28 Flowchart of the Acceptance Path Uniqueness Judging Process

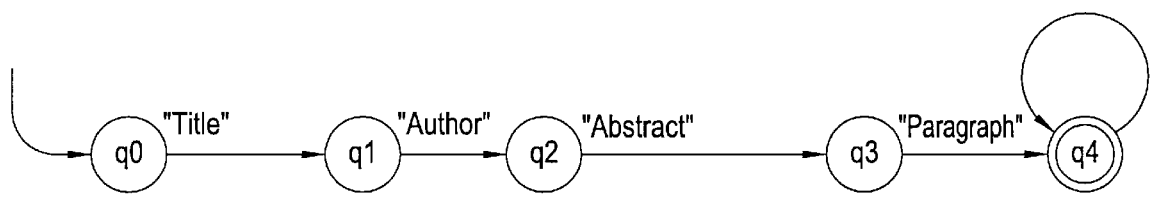
FIG. 29 Typical State Transitions in Which Type Node String Immediately Below Node "Summary Report" Is Accepted
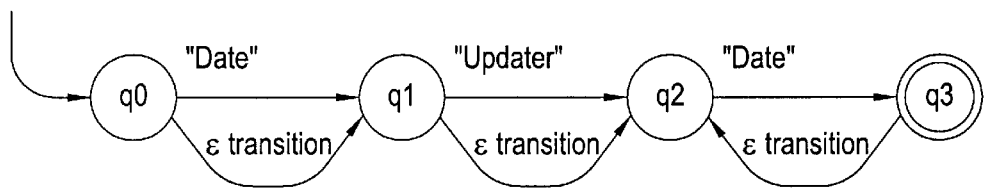
FIG. 30 Typical State Transitions in Which Type Node String Immediately Below Node "Summary Report" Is Accepted
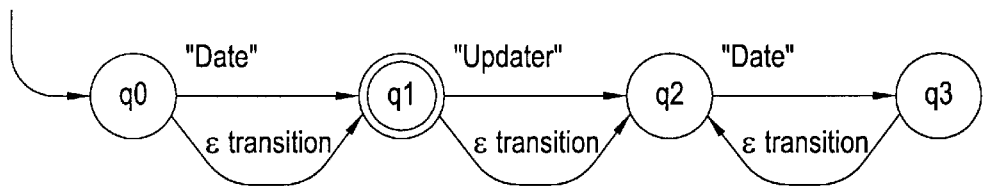
FIG. 31 Typical Automaton F1 Created in Uniqueness Judging Process
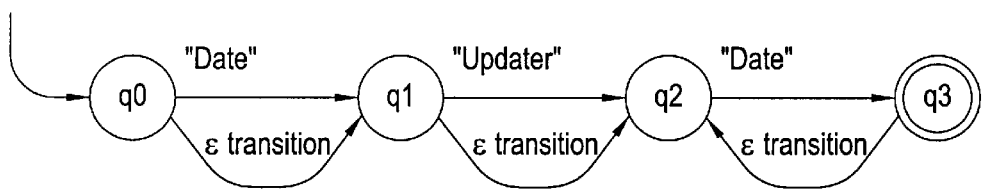
FIG. 32 Typical Automaton F2 Created in Uniqueness Judging Process

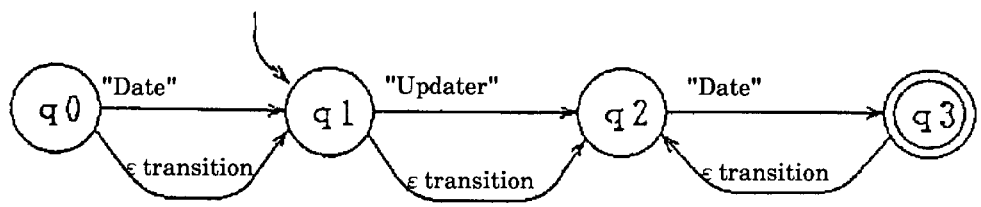
Fig. 33  Typical Automaton B1 Created in Uniqueness Judging Process
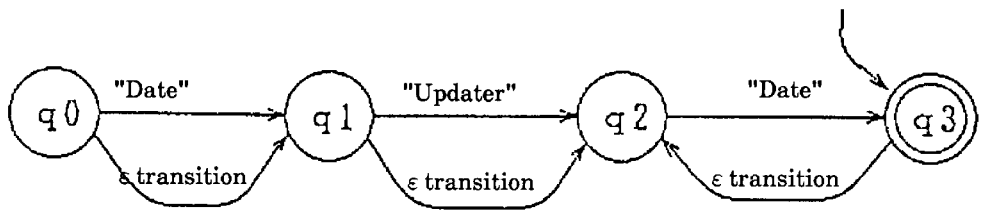
Fig. 34  Typical Automaton B2 Created in Uniqueness Judging Process

DOCUMENT GENERIC LOGICAL INFORMATION EDITING APPARATUS

BACKGROUND OF THE INVENTION

The present invention relates to a document generic logical information editing apparatus for editing document generic logical information generically defining the logical structure of a plurality of structured documents.

Recent advances in information processing equipment such as word processors, workstations and like devices are accompanied by the widespread use of electronic documents. As a result, it has become necessary to process large amounts of electronic documents automatically with relevant techniques. To carry out such processing requires that the target electronic documents, just as they are structured to let each of their text elements suitably express its meaning, should have a data structure allowing the multiple documents to share generically logical meanings therebetween.

The so-called structured document architecture stipulates that any one of its component documents possess not only its proper textual information but also document generic logical information expressing logical-unit meanings common to a plurality of documents making up the architecture. This kind of document architectures includes the SGML (Standard Generalized Markup Language; ISO 8879) and ODA (Open Document Architecture; ISO 8613).

In such document architectures, the document generic logical information (i.e., logical structure) is expressed by a directed sequential graph structure having "types" and "constructors" as its nodes. The types are elements that give logical meanings to parts constituting a document. The constructors are connectors that represent the relations between the types. In the SGML, such document generic logical information is expressed illustratively as a DTD (document type definition). The types and constructors are expressed as elements and connectors respectively, represented by an occurrence indicator each. In the ODA, for example, document generic logical information is expressed in the form of a generic logical structure. The types and constructors are expressed as logical object classes and construction terms, respectively.

In the above-described document architecture SGML, the document generic logical information representing the logical-unit structure of the elements constituting a document "summary report" is described illustrative in the following DTD (document type definition):

```
<!DOCTYPE summary report [
    <!ELEMENT summary report  - O (title, author, abstract,
    paragraph+)>
    <!ELEMENT title           - O (#PCDATA)>
    <!ELEMENT author          - O (#PCDATA)>
    <!ELEMENT abstract        - O (#PCDATA)>
    <!ELEMENT paragraph       - O (#PCDATA)>
]>
``` where, the symbol "," is a "seq" (sequential) constructor (connector) designating the sequence in which all elements must appear, and the symbol "+" is a "plus" constructor (occurrence indicator) indicating that the element in question has occurred at least once and may appear repeatedly. Also available but not shown are an "and" constructor represented by a symbol "&," an "or" constructor (connector) denoted by a symbol "|," and an "opt" constructor (another occurrence indicator) represented by a symbol "?." The "and" constructor (connector) designates that all elements may occur in any sequence, whereas the "or" constructor (connector) stipulates that only one of the elements must occur. The "opt" constructor (occurrence indicator) indicates that the element has occurred once or it need not occur again.

The symbol "<!" prefixed to each of the statements making up the document type definition is a markup declaration delimiter. The words "DOCTYPE" and "ELEMENT" following the delimiter without a space interposed are an element declaration keyword each. Specifically, the word "<!DOCTYPE" in the first statement is a reserved word designating the document type definition for the description that follows. Regarding elements of the document, the keyword "<!ELEMENT" prefixed to each statement works as a reserved word having the content of the document element structure (called a lower structure) designated by the description that follows. The names of the items described next (summary report, title, author, abstract, paragraph, etc.) represent the names of the logical units in the elements of the target document.

The subsequent symbols ("- -," "-○," "○○," etc.), as will be discussed later, are symbols indicating whether or not delimiter tags (a start tag followed by an end tag) designating the object of the item in question are omissible in the order indicated. The symbol "-" means that the tag corresponding thereto is not omissible, whereas the symbol "○" indicates that the corresponding tag is omissible. For example, if the symbols are shown as "- ○," it means that the start tag is not omissible while the end tag is omissible.

The word "#PCDATA" in the lower structure of the document elements is one of the reserved words of the SGML. In structural terms, the word means that the content is character data. In the above example of defining the document type for the document "summary report," the word "#PCDATA" indicates that the content of the structure including the elements "title," "author," "abstract" and "paragraph" is character data.

In the document type definition (DTD) above, the generic identifier "summary report" and the identifiers "title," "author," "abstract" and "paragraph" with respect to the logical-unit elements of other documents may all be regarded as type names. In that case, the document generic logical information "summary report" takes on a directed sequential tree structure having types and constructors as its nodes, as shown in FIG. 6. Type names generally recur, so that the data structure composed thereof is rarely a directed sequential tree structure; it most often turns out to be a directed sequential graph structure.

Shown illustratively below is a typical SGML document defined by the DTD of the document generic logical information representing the logical structure of the above document "summary report":

```
<summary report>
<title> SGML study report </title>
<author> Taro Fuji </author>
<abstract> This report reports on . . . </abstract>
<paragraph> This is the first paragraph. </paragraph>
<paragraph> This is the last paragraph. </paragraph>
</summary report>
```

The parts above such as <title>, </title>, etc. each beginning with a symbol "<" and ending with a symbol ">" are tags. They are delimiters used to delimit the elements (also called entities) of the document. Illustratively, there are two kinds of tags: a start tag indicating the start of the description of a document element (e.g., <title>), and an end tag denoting the end of the description of that document element (e.g., </title>).

The part enclosed by the start tag <summary report> and the end tag </summary report> becomes what is known as an instance of the document "summary report" with respect to its document type definition (DTD) class. For each element of the document, the part enclosed by the start tag (<title> and the end tag </title> is the element that becomes "title." Likewise the part enclosed by the start tag and the end tag is the element that becomes "abstract," and the part enclosed by the start tag <paragraph> and the end tag </paragraph> is the element that becomes "paragraph."

Conventionally, structured documents expressed as described above are edited by an editor (i.e., document editing apparatus) constituted so as to edit the target documents by utilizing document generic logical information which is embedded in the editor and which is common to these documents. In another arrangement, an analysis processor is activated to read the description of document generic logical information typically in text form before analyzing the document in question in accordance with the document generic logical information thus read. Such an analysis processor constitutes part of the editor for editing specific documents. These arrangements make it possible to create a specific set of documents based on the same document generic logical information. These sets of structured documents may be subjected to various kinds of automatic processing. For example, only titles may be extracted from a plurality of documents having as their document generic logical information the document type definition of the above document "summary report." The extracted titles may be used to prepare a summary. It is also possible to search through the documents using a character string contained in an abstract.

Each document is generated on the basis of the type (document type definition) and constructors constituting document generic logical information. The logical meaning (document structure) of a particular document thus generated is defined by the document generic logical information common to a plurality of documents. However, even if each document is generated on the basis of such logical information, it may not be possible to extract as a tree structure any of those logical units from a specific document which are defined by the document generic logical information.

For example, the "paragraph," an element of the document "summary report" based on the above-described document type definition, may be structurally defined in more detail. Specifically, the paragraph may be constituted by a paragraph heading and by repetitions of at least one paragraph content. An example of such definition is as follows:

```
<!DOCTYPE report [
<!ELEMENT report - o (title, author, history, abstract, paragraph+)>
<!ELEMENT title - o (#PCDATA)>
<!ELEMENT author - o (#PCDATA)>
<!ELEMENT history - o (date?, updater?, date+)>
<!ELEMENT abstract - o (#PCDATA)>
<!ELEMENT paragraph - o ((paragraph heading, paragraph content+) +>
<!ELEMENT paragraph heading - o (#PCDATA)>
<!ELEMENT paragraph content - o (#PCDATA)>
]>
```

The provisions of the above document type definition illustratively allow a specific document of the following document structure to be created:

```
<report>
<title> SGML study report </title>
<author> Taro Fuji </author>
<abstract> This report reports on . . . </abstract>
<history>
<date> OCT/20/'93 </date>
<date> OCT/10/'93 </date>
</history>
<paragraph>
<paragraph heading> 1. Paragraph 1 </paragraph heading>
<paragraph content> This is the first passage of Paragraph 1. </paragraph content>
<paragraph content> This is the last passage of Paragraph 1. </paragraph content>
<paragraph heading> 2. Paragraph 2 </paragraph heading>
<paragraph content> This is the first passage of Paragraph 2. </paragraph content>
<paragraph content> This is the last passage of Paragraph 2. </paragraph content>
</paragraph>
</report>
```

In the structure of the above document, the document elements which contain a character string "Paragraph 2" in the "paragraph content" and which are logical units that may be extracted are "paragraph content," "paragraph" and "report." In this logical structure, the portion ranging from the "paragraph heading" containing the character string "Paragraph 2" to the "paragraph content" that follows it constitutes a logical unit. According to the description (document generic logical information) of the document type definition (DTD) of the SGML, however, there exists no node indicating any logical agglomeration. Thus such a logical unit cannot be extracted as a tree structure.

Traditionally, the document generic logical information for defining the above document structure is used primarily for text styling purposes in editing documents. Thus under constraints of the document generic logical information, there have been few problems even if it is impossible to extract a logic unit as a tree structure from structured documents.

However, automatic document processing such as search, manipulation and composition is not efficiently available if the elements of documents are not conducive to being handled according to a structured document structure. If it is impossible to extract as a tree structure any logical unit of a specific document during automatic processing, there are two options: either to extract the logic unit in whatever structure is currently available (i.e., other than the tree structure), or to extract a tree structure hierarchically higher than, and inclusive of, the logical unit that needs to be extracted.

In the first option, the target logical unit may be extracted illustratively as a string or a tuple of a plurality of tree structures. In that case, the user is required, upon such extraction, first to designate the applicable part using a string, a tuple, etc. more complicated than the tree structure and then to describe the necessary processing based on the particular structure of the string, tuple, etc.

In the second option above, the extracted tree structure contains unnecessary information other than the desired logical unit. This requires executing a script describing the processing by which to extract only the necessary structure.

Either of these options involves extra chores and additional tasks such as the transfer and/or the removal of superfluous data.

In recent years, word processors have been required to let users submit their individual documents to automatic processing. However, conventional word processors have yet to deal sufficiently with the editing of specific documents in accordance with the logical structure stipulated by the document generic logical information embedded in the editor of the processors. It is thus necessary first to read the description of document generic logical information, next to edit the target document, and then to edit the document with respect to its logical structure. Another problem with conventional editors is that they have yet to support the preparation of document generic logical information allowing a logical unit to be extracted as a tree structure from a particular document.

There are cases where a specific document is prepared on the basis of the types and constructors constituting a document generic logical structure, the document being subsequently interpreted in terms of the document structure. In some of these cases, the document in question may not be interpreted uniquely in accordance with the document generic logical information. For example, if the "paragraph" in the document type definition of the above "summary report" is not divided into the "paragraph heading" and "paragraph content," then the document type definition will be given as follows:

```
<!DOCTYPE report [
<!ELEMENT report - O (title, author, history, abstract,
paragraph+)>
<!ELEMENT title - O (#PCDATA)>
<!ELEMENT author - O (#PCDATA)>
<!ELEMENT history - O (date?, updater?, date+)>
<!ELEMENT abstract - O (#PCDATA)>
<!ELEMENT paragraph - O (#PCDATA)>
]>
```

The provisions of the above document type definition illustratively allow a particular document of the following document structure to be created:

```
<report>
<title> SGML study report </title>
<author> Taro Fuji </author>
<abstract> This report reports on . . . </abstract>
<history>
<date> OCT/20/'93 </date>
<date> OCT/10/'93 </date>
</history>
<paragraph>
<paragraph> This is the first paragraph. </paragraph>
<paragraph> This is the last paragraph. </paragraph>
</report>
```

In the document of the above structure, each of the elements "date" in the document element "history" is interpreted by use of the logical structure provisions <!ELEMENT history - o (date?, updater?, date+)>. In that case, there can be two interpretations. The first interpretation is that "<date>OCT/20/'93 </date>" corresponds to "date?" and <date> OCT/10/'93 </date> to "date+." The second interpretation considers that <date> OCT/20/'93 </date> and <date> OCT/10/'93 </date> both correspond to "date+."

Thus according to the first interpretation, "<date> OCT/20/'93 </date>" represents the last update date and the last updater is omitted. By the second interpretation, "<date> OCT/20/'93 </date>" is simply an update date other than the last update date, and the last update date and the last updater are omitted.

As outlined, the logical information on documents is used conventionally for text styling purposes and does not necessarily stipulate the unique way in which each of these documents is to be interpreted. However, unless a specific document is always interpreted uniquely for automatic processing such as search, manipulation and composition of document elements, the following problem will occur:

For automatic processing, logical information is utilized in accordance with the logical meaning of the document structure. This means that if a particular document is not interpreted uniquely with respect to a generic logical structure, there cannot be a unique meaning ascribed to the logical information on the document in question. Illustratively, an automatic search based on logical information requires carrying out complex inquiries in order to obtain the desired result. To perform an automatic editing process requires executing a complex script. Meeting these requirements involves the user performing extra chores, which means that automatic processing aimed at acquiring the desired results is impossible. For example, it is virtually impossible automatically to carry out a process of extracting, from a set of documents having the above-described generic logical information, a summary composed of the element titles and the last update dates of all documents each having its last update date designated.

SUMMARY OF THE INVENTION

It is therefore an object of the present invention to provide a document generic logical information editing apparatus for editing document generic logical information for document editing purposes in such a manner that the arrangements for designating automatic document editing processes such as search, manipulation and composition of document elements are simplified using the edited information; that the procedures for transferring and removing unnecessary data are eliminated; and that users' chores associated with extra tasks of such data handling are alleviated.

It is another object of the invention to provide a document generic logical information editing apparatus for editing document generic logical information in such a manner that any logical unit may be extracted as a tree structure from structured documents based on the logical information.

It is a further object of the invention to provide a document generic logical information editing apparatus for editing only that kind of document generic logical information whereby any one of structured documents is always given a unique meaning when interpreted.

In carrying out the invention and according to one aspect thereof, there is provided a document generic logical information editing apparatus comprising: generic logical information editing means for defining the possible logical structure of structured documents by use of a directed sequential graph structure having nodes selected from the group consisting of types and constructors, the types giving logical meaning to elements constituting part of the documents, the constructors representing the relations between the types; and judging means for judging, upon editing by the document generic logical information editing means and depending on the kind of the nodes, whether the document generic logical information meets restrictions on at least either the kinds or the number of nodes subordinate to the nodes so that only a desired part will be extracted as elements from any document prepared to include the elements corresponding to the types included in the document generic logical information.

These and other objects, features and advantages of the invention will become more apparent upon a reading of the following description and appended drawings.

BRIEF DESCRIPTION OF THE DRAWINGS

FIG. 1 is a block diagram of a document generic logical information editing apparatus practiced as an embodiment of the invention;

FIG. 2 is an overall flowchart of steps in which an editing device of the embodiment works;

FIG. 3 is a flowchart of a subroutine for adding nodes to the processing flow of FIG. 2;

FIG. 4 is a flowchart of a subroutine for changing nodes in the processing flow of FIG. 2;

FIG. 5 is a flowchart of a subroutine for checking to see if restrictions are met in the processing flow of FIGS. 2 through 4;

FIG. 6 is a schematic view showing a typical data structure composed of graph structure data including types and constructors;

FIG. 7 is a schematic view depicting a set of nodes which is subordinate to a "seq" node and which may be extracted structurally;

FIG. 8 is a schematic view illustrating a set of nodes which is subordinate to a "seq" node and which cannot be extracted structurally;

FIG. 9 is a schematic view indicating a set of nodes which is subordinate to an "or" node and which may be extracted structurally;

FIG. 10 is a schematic view exhibiting a set of nodes which is subordinate to an "or" node and which cannot be extracted structurally;

FIG. 11 is a schematic view presenting a set of nodes which is subordinate to an "and" node and which may be extracted structurally;

FIG. 12 is a schematic view sketching a set of nodes which is subordinate to an "and" node and which cannot be extracted structurally;

FIG. 13 is a schematic view portraying a node which is subordinate to a "plus" node and which may be extracted structurally;

FIG. 14 is a schematic view picturing a set of nodes which is subordinate to a "plus" node and which cannot be extracted structurally;

FIG. 15 is a schematic view showing a node which is subordinate to an "opt" node and which may be extracted structurally;

FIG. 16 is a schematic view depicting a set of nodes which is subordinate to an "opt" node and which cannot be extracted structurally;

FIG. 17 is a view of a structure display window outlining document generic logical information;

FIG. 18 is an overall flowchart of editing steps in which a first variation of the embodiment works;

FIG. 19 is an overall flowchart of editing steps in which a second variation of the embodiment works;

FIG. 20 is an overall flowchart of a judging device variation of the embodiment executing the process of checking to see if restrictions are met;

FIG. 21 is a flowchart of the process of creating a basic finite automaton during the processing of FIG. 20;

FIG. 22 is a schematic view showing how to create a finite automaton for accepting a type "title";

FIG. 23 is a schematic view depicting how to create a finite automaton for accepting an "opt(X)" node;

FIG. 24 is a schematic view illustrating how to create a finite automaton for accepting a "plus(X)" node;

FIG. 25 is a schematic view indicating how to create finite automatons for accepting a "seq(X, Y, ..., Z)" node;

FIG. 26 is a schematic view expressing how to create finite automatons for accepting an "or(X, Y, ..., Z)" node;

FIG. 27 is a schematic view exhibiting how to create finite automatons for accepting an "and(X, Y, ...)" node;

FIG. 28 is a flowchart showing how the path of acceptance of a basic finite automaton is judged to be unique or not;

FIG. 29 is a state transition diagram of a finite automaton accepting a string of type nodes immediately below a node "summary report";

FIG. 30 is a state transition diagram of a nondeterministic finite automaton including $\epsilon$ actions for accepting a string of type nodes immediately below a node "history";

FIG. 31 is a state transition diagram of a finite automaton F1 which is created by the process of judging whether or not the path of acceptance is unique and which accepts a string of type nodes immediately below a node "history";

FIG. 32 is a state transition diagram of a finite automaton F2 which is created by the process of judging whether or not the path of acceptance is unique and which accepts a string of type nodes immediately below a node "history";

FIG. 33 is a state transition diagram of a finite automaton B1 created by the process of judging whether or not the path of acceptance is unique; and FIG. 34 is a state transition diagram of a finite automaton B2 which is created by the process of judging whether or not the path of acceptance is unique and which accepts a string of type nodes immediately below a node "history."

DESCRIPTION OF THE PREFERRED EMBODIMENTS

Preferred embodiments of the invention will now be described with reference to the accompanying drawings. FIG. 1 is a block diagram of a document generic logical information editing apparatus practiced as one embodiment of the invention. As shown in FIG. 1, the embodiment is constituted primarily by a commanding device 10, a command analyzing device 11, a display control device 12, an editing device 13, a judging device 14, a state retaining device 15, a holding device 16 and a display device 20.

The holding device 16 is implemented illustratively in the form of a hard disc drive and constitutes a functional element for holding document generic logical information. A plurality of sets of document generic logical information are held in the holding device 16. For example, the holding device 16 may be a filing system equipped with magnetic discs or a data dictionary comprising a document database having generic logical information as its schema.

The command analyzing device 11 is a functional element for analyzing the input from the commanding device 10 such as a mouse and a keyboard operated by a user. After analyzing the event input by the user, the command analyzing device 11 notifies the editing device 13 of the contents of the analyzed command. The display control device 12 causes the display device 20 to display the information transferred by the editing device 13 following retrieval from the state retaining device 15 wherein the information is retained.

In accordance with the command from the command analyzing device 11, the editing device 13 changes the state (i.e., graph structure data) retained in the state retaining device 15, or saves the state from the state retaining device 15 into the holding device 16. The state thus handled is sent to the display control device 12. Upon receipt of the state (graph structure data) of the document generic logical information from the editing device 13, the judging device 14 judges whether or not the state of the logical information meets given restrictions. The result of the judgment is sent to the editing device 13.

The command analyzing device 11, display control device 12, editing device 13 and judging device 14 are operated by the CPU executing suitable programs for implementing the functions of the respective devices. The state retaining device 15 is a functional element for retaining the state (graph structure data) being currently edited. The half-edited state is changed under instructions from the editing device 13. Illustratively, the state retaining device 15 may be a main memory or a hard disc drive.

Below is a description of how the document generic logical information editing apparatus of the above constitution operates. The command analyzing device 11 analyzes command from the user and notifies the editing device 13 of an order either for preparing anew the document generic logical information to be edited, or for reading the information from the holding device 16 for editing purposes. Upon receipt of the order for preparing new document generic logical information, the editing device 13 causes the state retaining device 15 to retain a type that will be used as a root node of a graph structure. When receiving alternatively the order for reading the currently held information, the editing device 13 reads the target document generic logical information from the holding device 16. The editing device 13 then orders the state retaining device 15 to retain the nodes constituting the graph structure.

At this point, as shown in FIG. 17, a structure display window 170 of the document generic logical information appearing on the display device 20 shows a graph structure made up of types and constructors as well as selected nodes. The document generic logical information in this graph structure constitutes a screen display example in effect when the document generic logical information about the above-described document called "summary report" is retrieved. In this example, a type node 171 is selected from the document generic logical information regarding the "summary report." In the indicated structure, the node immediately below the type node 171 is a "seq" constructor node 172.

The command analyzing device 11 analyzes the user's operation command input from the commanding device 10, and notifies the editing device 13 of the selection, addition, erasure or change of nodes. For example, when notified of the selection of a node, the editing device 13 orders the state retaining device 15 to retain the currently selected node and causes the selected node to be displayed in the structure display window 170 of the document generic logical information, as shown in FIG. 17.

If notified of the addition of a node, the editing device 13 indicates alternative locations to which the node may be added in the structure display window 170 that is shown on the display device 20 via the display control device 12. The user enters a command for selecting one of the alternatives indicated. Specifically, the user instructs the editing device 13 via the command analyzing device 11 to; (a) add the node to the selected node as its first child; (b) add the node to the selected node as its last child; (c) add the node to the selected node as the brother immediately preceding it; or (d) add the node to the selected node as the brother immediately following it.

When the user enters through the commanding device 10 a command to select one of the alternatives presented, the command is sent to the editing device 13 by way of the command analyzing device 11. The editing device 13 adds the node to the graph structure data accordingly. With the node added, the editing device 13 likewise notifies the user, via the display control device 12, of a list of alternative kinds of node that may be added further.

In response, the user tells the editing device 13 via the command analyzing device 11 the kind of node: constructor ("seq" constructor, "plus" constructor, "opt" constructor, "or" constructor, "and" constructor) or type. If the addition of a type is designated, the editing device 13 supplies the user via the display control device 12 with a message prompting him to specify a type name. In response, the user gives an existing or a newly prepared type name to the editing device 13 by way of the command analyzing device 11.

Before a display is made of the alternative kinds of the node to be added, the alternatives to be displayed need to be selected. That is, the editing device 13 selects one node from the constructors ("seq" constructor, "plus" constructor, "opt" constructor, "or" constructor, "and" constructor), another node from all types having the existing type names, and another node from types having new type names. The selected nodes are added to the graph structure.

In that case, a copy of the graph structure data in its original state is preserved every time an addition is made. Every time a node is added, the editing device 13 requests the judging device 14 to judge whether the graph structure meets the restrictions currently in effect.

The judging device 14 judges as requested whether the graph structure with the node added thereto meets the restrictions in effect, and notifies the editing device 13 of the result of the judgment. The editing device 13 selects only the node that will constitute a graph structure judged to meet the restrictions by the judging device 14. The selected node is reported to the user via the display control device 12. Given the selected node, the user supplies the editing device 13, via the command analyzing device 11, with an existing or a newly created type name.

In response, the editing device 13 adds the node to the graph structure retained in the state retaining device 15 in accordance with the locations to which to add the node, with the distinction of either the node kind ("seq" constructor, "plus" constructor, "opt" constructor, "or" constructor, "and" constructor) or the type kind, and with the type name if the type is selected.

When the addition of a node is designated, any input interface scheme may be adopted for the command analyzing device 11 to notify the editing device 13 of the locations to which to add the node, of the distinction of either the node kind ("seq," "plus," "opt," "or," "and") or the type kind, and of the type name if the type is selected. Illustratively, where the addition of the type is reported to the editing device 13, the type name may also be reported simultaneously. Alternatively, instead of designating only the addition of the node, the command analyzing device 11 may specify the distinction of either the constructor ("seq," "plus," "opt," "or," "and") or the type, as well as the type name altogether.

With this embodiment, when the editing device 13 is to change by editing the graph structure retained by the state retaining device 15 into a type-supplemented graph structure, the graph structure may be found failing to meet the restrictions if changed. In that case, the structure changing process is invalidated. Specifically, the editing device 13 first preserves a copy of the graph structure in its current state in preparation for possible subsequent process backtracking and then adds the node to the graph structure. Thereafter, the editing device 13 requests the judging device 14 to judge whether the graph meets the restrictions in force. The judging device 14 judges whether the graph meets the restrictions, and notifies the editing device 13 of the result of the judgment. If the judging device 14 finds the graph failing to meet the restrictions, the editing device 13 restores the copied original graph to the state retaining device 15, and invalidates the command ordering the addition.

When the erasure of a node is specified, the editing device 13 also preserves a copy of the graph structure in its current state in preparation for possible subsequent process backtracking before the target node is erased from the graph structure. Specifically, the editing device 13 orders the state retaining device 15 to retain the original data copy of the graph structure and checks to see if the selected node is erasable prior to the actual erasure of the node.

In erasing the node in question, the editing device 13 requests the judging device 14 to judge whether the graph minus the node meets the restrictions in force. The judging device 14 judges as requested whether the graph meets the restrictions, and notifies the editing device 13 of the result of the judgment. If the judging device 14 finds the graph failing to meet the restrictions, the editing device 13 restores the copied original graph structure data to the state retaining device 15 and invalidates the command for erasing the node in question.

If the erasure command may be arranged so that the node to be invalidated will not be erased immediately, the above processing method may be replaced by an alternative method. For example, when the node is selected, the above-described processing may be carried out concurrently and, with the erasure command now known to become invalidated, that command may be rejected at that point.

When the change of a node is reported, the editing device 13 notifies the user, via the display control device 12, of the alternative kinds of the node to be changed eventually. From these alternatives, the user selects the distinction of either the constructor ("seq," "plus," "opt," "or," "and") or the type, and gives his choice to the editing device 13 by way of the command analyzing device 11. If the change of the type is reported, the editing device 13 gives the user via the display control device 12 a message prompting him to designate a type name. In response, the user tells an existing or a newly prepared type name to the editing device 13 through the command analyzing device 11.

Before a display is made of the alternative kinds of the node to be eventually changed, these alternatives need to be selected. In that case, the editing device 13 selects one node from the constructors ("seq," "plus," "opt," "or," "and"), another node from all types having the existing type names, and another node from types having new type names. Each of the selected nodes is then brought into force.

In the case above, a copy of the graph structure data in its original state is preserved every time a node change is made. Every time a node is changed, the editing device 13 requests the judging device 14 to judge whether the graph structure with the node change made thereto meets the restrictions in effect. The judging device 14 judges as requested whether the graph structure meets the restrictions, and notifies the editing device 13 of the result of the judgment. The editing device 13 selects only the node that will constitute a graph structure judged to meet the restrictions by the judging device 14. The selected node is reported to the user via the display control device 12. With regard to the selected node, the user supplies the editing device 13 with an existing or a newly created type name by way of the command analyzing device 11.

In the manner described, the editing device 13 changes the selected node of the graph structure data retained by the state retaining device 15 in accordance with the distinction of either the constructor ("seq," "plus," "opt," "or," "and") or the type, and with the type name if the type is selected. If the eventually changed type name is reported to the editing device 13 when the type change command is given, the above processing method may be replaced by an alternative method. For example, when a type change is reported, the type name may also be reported simultaneously. Alternatively, instead of having the node change designated, it is possible to specify the distinction of either the constructor ("seq," "plus," "opt," "or," "and") or the type, as well as the type name altogether.

The command analyzing device 11 analyzes the command from the user and notifies the editing device 13 that the command is for data preservation or for data destruction. When notified of the command for data preservation, the editing device 13 orders the holding device 16 to save the node-based graph structure data retrieved from the state retaining device 15; given the command for data destruction, the editing device 13 discards the node-based graph structure data retained in the state retaining device 15.

If the command for data preservation is issued and if the graph structure is found failing to meet the restrictions before the node graph in the state retaining device 15 is to be saved into the holding device 16, the data preservation command is invalidated. In that case, the editing device 13 requests the judging device 14 to judge whether the eventually prepared graph structure meets the restrictions in force. The judging device 14 judges as requested whether the graph structure meets the restrictions, and notifies the editing device 13 of the result of the judgment. If the judging device 14 finds the graph structure meeting the restrictions, the editing device 13 saves into the holding device 16 the graph structure data from the state retaining device 15; if the judging device 14 finds the graph structure data failing to meet the restrictions, the editing device 14 notifies the user of the type judged not to meet the restrictions by way of the display control device 12, and invalidates the command for data preservation.

In the case above, the judging device 14 under control of the editing device 13 also judges whether the restrictions is met by the graph structure data in the state retaining device 15 and by the reported node that is structurally higher than and the closest to the selected node. The result of the judgment is reported to the editing device 13.

When the document generic logical information is edited in the manner described, logical units in structured documents based on the edited information may be extracted in the form of a tree structure each. Thus the way to submit documents based on the document generic logical information to automatic editing is simplified. Because there is no need to carry out unnecessary data transfer or to remove spurious data, the user's chores are alleviated significantly.

How the editing device of the embodiment deals with document generic logical information will now be described in more specific terms with reference to the accompanying flowcharts. Of these flowcharts, FIG. 2 is an overall flowchart of steps in which the editing device of the embodiment works; FIG. 3 is a flowchart of a subroutine for adding nodes to the processing flow of FIG. 2; FIG. 4 is a flowchart of a subroutine for changing nodes in the processing flow of FIG. 2; and FIG. 5 is a flowchart of a subroutine for checking to see if restrictions are met in the processing flow of FIGS. 2 through 4.

The overall flow of the editing process regarding the document generic logical information is outlined below with reference to FIG. 2. In step 21, a check is made to see if document generic logical information is to be prepared anew. If the check in step 21 shows that new document generic logical information need not be prepared, the preserved data is retrieved from the holding device in step 22. If the check in step 21 shows that document generic logical information needs to be prepared anew, step 23 is reached. In step 23, a graph composed of one node (graph structure data) is created.

In step 24, a check is made to see if the command for editing the document generic logical information is "Select." If the command is found to be "Select," step 25 is reached. In step 25, a node is selected. Step 25 is followed by step 38 in which a check is made to see if the command then received specifies that the editing process is to continue. If the editing process is allowed to continue, step 24 is reached again and the process is repeated from there.

If the command for editing the document generic logical information is not found to be "Select" in step 24, step 26 is reached. In step 26, a check is made to see if the edit command is "Add." If the command is found to be "Add," step 27 is reached in which the location to which to add the node is accepted. Step 27 is followed by step 28 in which the node is added (see FIG. 3). Step 28 is followed by step 38 in which a check is made to see if the command then received specifies that the editing process is to continue. If the editing process is allowed to continue, step 24 is reached again and the process is repeated from there.

If the command for editing the document generic logical information is found to be "Change" instead of "Select" or "Add" in step 29, step 30 is reached. In step 30, the node is changed (see FIG. 4). Step 30 is followed by step 38 in which a check is made to see if the command then received specifies that the editing process is to continue. If the editing process is allowed to continue, step 24 is reached again and the process is repeated from there.

If the command for editing the document generic logical information is found to be none of "Select," "Add" and "Change" in step 29, it is assumed for the time being that the node in question is to be erased. In that case, a copy of the original state (graph structure data) is made in step 31 in preparation for possible subsequent process backtracking in case the erasure process is found failing to meet the restrictions in force. In step 32, a check is made to see if the edit command is "Erase." If the command is found to be "Erase," step 33 is reached in which the node in question is erased. In step 34, a subroutine is executed to check if the restrictions are met (see FIG. 5). In step 35, the result of the subroutine execution in step 34 is judged. If the judgment in step 35 shows that the node-erased graph structure fails to meet the restrictions, step 36 is reached in which the copied state (graph structure data) is restored so as to invalidate the node erasure process. If the judgment in step 35 indicates that the node-erased graph structure meets the restrictions, step 37 is reached in which the node erasure process is validated and the copied state (graph structure data) is discarded. Step 36 or 37 is followed by step 38.

If the check in step 32 fails to verify that the edit command is "Erase," step 38 is reached immediately thereafter. In step 38, a check is made to see if the command then received specifies that the editing process is to continue. If the editing process is allowed to continue, step 24 is reached again and the process is repeated from there.

If the check in step 38 finds that the command then received specifies that the editing process is to discontinue, step 39 is reached. In step 39, a check is made to see if the command then received specifies that the result of the editing process so far is to be preserved. If the result of the editing process is not to be preserved, step 40 is reached. In step 40, the currently edited data in the state retaining device is discarded. If the command allows the result of the editing process to be preserved, step 41 is reached in which the currently edited data is preserved in the state retaining device.

In step 42, a check is made to see if the editing of the document generic logical information has come to an end. If the end has yet to be reached, step 21 is reached again and the process is repeated from there. If the editing of the document generic logical information is found to be terminated in step 42, the whole process comes to an end.

In the manner described, the document generic logical information is prepared anew, selected, added to, changed, erased, continued, preserved or ended as instructed (by edit commands) while being edited.

The process for adding nodes (in step 28) to the document generic logical information will now be described with reference to FIG. 3. When the node adding process is started, a copy is made of the original state (graph structure data) halfway through the process as described above in preparation for possible subsequent process backtracking in case the node adding process is found failing to meet the restrictions in force. In step 301, a copy is made of the original state (graph structure data). In step 302, the constructors ("seq," "plus," "opt," "or," "and"), all types having previously prepared type names, and nodes of new types are established as addable nodes. In step 303, one addable node is selected and extracted.

In step 304, another copy is made of the original state. In step 305, the extracted addable node is added. In step 306, the process of judging restriction compliance (see FIG. 5) is carried out. In step 307, the result of the restriction compliance judging process is verified. If the result in step 307 shows that the node-supplemented graph structure meets the restrictions, step 308 is reached in which the extracted node is added to the selected node. Step 308 is followed by step 309. If the check in step 307 shows that the node-supplemented graph structure fails to meet the restrictions, step 309 is reached. In step 309, a check is made to see if there still exists any addable node. If there is an addable node, step 310 is reached in which the original state is restored. In step 311, another addable node is extracted. After step 311, step 304 is reached again and the process is repeated from there.

If the check in step 309 shows that there exists no further addable node, step 312 is reached in which the selected node is presented to the user. In step 313, the user-selected node is added. Thereafter, control is returned from the node adding process to the initial processing.

The node changing process (in step 30) will now be described further with reference to FIG. 4. In this process, as in the preceding process, a copy is made of the original state (graph structure data) halfway through the processing in preparation for possible subsequent process backtracking in case the node changing process is found failing to meet the restrictions in force. With the node changing process started, step 401 is first reached in which a copy is made of the original state (graph structure data). In step 402, the constructors ("seq," "plus," "opt," "or," "and"), all types having previously prepared type names, and nodes of new types are established as changeable nodes. In step 403, one changeable node is selected and extracted.

In step 404, another copy is made of the original state. In step 405, the selected node is replaced by the extracted changeable node. In step 406, the process of judging restriction compliance (see FIG. 5) is carried out. In step 407, the result of the restriction compliance check is verified. If the result in step 407 shows that the changed graph structure meets the restrictions, step 408 is reached in which the extracted node is added to the selected node. Step 408 is followed by step 409. If the check in step 407 shows that the changed graph structure fails to meet the restrictions, step 409 is reached. In step 409, a check is made to see if there still exists any changeable node. If there is a changeable node, step 410 is reached in which the original state is restored. In step 411, another changeable node is extracted. After step 411, step 404 is reached again and the process is repeated from there.

If the check in step 409 shows that there exists no further changeable node, step 412 is reached in which the selected node is presented to the user. In step 413, the selected node is replaced by the user-selected node. After this, control is returned from the node changing process to the initial processing.

The process of judging restriction compliance will now be described with reference to FIG. 5. The restriction compliance judging process is one of the frequently repeated processes in editing nodes for the document generic logical information. Specifically, the judging device 14 judges whether the data constituting the graph structure of the half-edited document generic logical information held in the state retaining device 15 meets the restrictions in force.

When the restriction compliance judging process is started, step 501 is reached first in which the node to be judged in the graph structure data is ascertained. If the node in question is any one of the constructors "seq," "or" and "and." If the node is found to be one of these constructors, step 502 is reached. In step 502, a check is made to see if the nodes subordinate to the target node constitute a string of mutually different types. If the subordinate nodes are found to form a string of mutually different types, step 503 is reached in which the restrictions are judged to be met. In that case, a restriction compliance code is sent back and control is returned to the initial processing. If the subordinate nodes are found not to constitute a string of mutually different types, step 504 is reached in which the restrictions are judged not to be complied with. In that case, a restriction noncompliance code is sent back and control is returned to the initial processing.

If, in step 501, the node in question is found to be other than the constructors "seq," "or" and "and," step 505 is reached. In step 505, a check is made to see if the target node is a type. If the node is found to be a type, step 506 is reached. In step 506, a check is made to see if the node subordinate to the target node is a constructor. If the subordinate node is found to be a constructor, step 507 is reached in which the restrictions are judged to be met. In that case, a restriction compliance code is sent back and control is returned to the initial processing. If the check in step 506 finds the subordinate node to be other than a constructor, step 508 is reached in which the restrictions are judged not to be complied with. In that case, a restriction noncompliance code is sent back and control is returned to the initial processing.

If, in step 505, the node in question is found to be other than a type, step 509 is reached. In step 509, a check is made to see if the target node is either a constructor "plus" or a constructor "opt." If the node is found to be one of the two constructors, step 510 is reached. In step 510, a check is made to see if the node subordinate to the target node is a type. If the subordinate node is found to be a type, step 511 is reached in which the restrictions are judged to be met. In that case, a restriction compliance code is sent back and control is returned to the initial processing. If the check in step 510 finds the subordinate node to be other than a type, step 512 is reached in which the restrictions are found not to be complied with. In that case, a restriction noncompliance code is sent back and control is returned to the initial processing.

It may happen that the check in step 501 finds the target node to be other than the constructors "seq," "or" and "and," that the check in step 505 finds the node in question to be other than a type, and that the check in step 509 finds the node to be neither the constructor "plus" nor the construction "opt." In that case, step 513 is reached in which the restrictions are judged not to be complied with. Then a restriction noncompliance code is sent back and control is returned to the initial processing.

As described, the judging process above finds the document generic logical information to meet the logical structure restrictions in one of three cases: (a) where the node in question is any one of the constructors "seq," "or" and "and" followed structurally by the subordinate nodes constituting a string of mutually different types; (b) where the target node is a type followed structurally by the subordinate node being a single constructor; or (c) where the target node is either the constructor "plus" or the constructor "opt" followed structurally by the subordinate node being a type.

In other words, the restriction compliance judging process checks the compliance of the nodes in the graph structure data with the restrictions in force by verifying what kinds of type nodes can appear in what sequence below the type node. Thus when a node is added, erased or changed during the editing process of the document generic logical information, the node in question and those structurally above it are retraced up to the first type node for compliance with the restrictions in force.

The principle of the restriction compliance judging process will now be described. For example, the document generic logical information regarding the document structure of the above-mentioned "summary report" is edited in the logical structure display window 170, as shown in FIG. 17. The substance of the document generic logical information is graph structure data composed of types and constructors, as depicted in FIG. 6. In such graph structure data, the first type node structurally above a "seq" node 607 is a "summary report" type node 601. Subordinate to the "seq" node 602 are three type nodes "title," "author" and "abstract," and one constructor node "plus." Below the "plus" node is a "paragraph" type node.

For the above graph structure, at least five restrictions shown below are simultaneously established. The restriction compliance judging process (see FIG. 5) checks to see if the following restrictions 1 through 5 are complied with in the graph structure:

Restriction 1: Subordinate to a "seq" node must be a string of mutually different types only.

Restriction 2: Subordinate to an "or" node must be a string of mutually different types only.

Restriction 3: Subordinate to an "and" node must be a string of mutually different types only.

Restriction 4: Subordinate to a "plus" node must be a single type only.

Restriction 5: Subordinate to an "opt" node must be a single type only.

When the graph structure nodes of structured documents meet the above restrictions 1 through 5, any logical unit in any of such documents may be extracted as a tree structure of document elements in accordance with the document generic logical information. The documents may be searched, manipulated or composed in increments of the logical unit.

How document structures are formulated by the restrictions 1 through 5 will now be described in specific terms. FIG. 7 is a schematic view depicting a set of nodes which is subordinate to a "seq" node and which may be extracted structurally, and FIG. 8 is a schematic view illustrating a set of nodes which is subordinate to a "seq" node and which cannot be extracted structurally.

In the example of FIG. 7 in which generic logical information is made up of document elements "a" and "b" connected by a constructor "seq" (a, b), the restriction 1 is met. Since the document elements "a" and "b" are different types, each of the elements may be extracted as a tree structure. If the generic logical information is composed of document elements "a" and "b" connected by a constructor "seq," the element "b" being allowed to recur by a constructor "plus" (a, b+) as depicted in FIG. 8, then the restriction 1 is not met. This is due to the recurrence of the document element "b." In other words, the presence of a plurality of document elements "b" in a document prevents the "b+" part from getting extracted as a tree structure. The "seq" node represents a string of logical units, and each of the nodes constituting the subordinate string represents a logical unit. When the restriction 1 is complied with, all logical units in the subordinate string can be extracted.

FIG. 9 is a schematic view indicating a set of nodes which is subordinate to an "or" node and which may be extracted structurally, and FIG. 10 is a schematic view exhibiting a set of nodes which is subordinate to an "or" node and which cannot be extracted structurally. In the example of FIG. 9 in which generic logical information is made up of document elements "a" and "b" connected by a constructor "or" (a|b), the restriction 2 is met. Since the document elements "a" and "b" are different types, each of the elements may be extracted as a tree structure. If the generic logical information is composed of document elements "a" and "b" connected by a constructor "or," the element "b" being allowed to recur by a constructor "plus" (a|b+) as depicted in FIG. 10, then the restriction 2 is not met. This is due to the recurrence of the document element "b." In other words, the presence of a plurality of document elements "b" in a document prevents the "b+" part from getting extracted as a tree structure. The "or" node represents a choice of logical units, and each of the nodes constituting the subordinate string represents a logical unit. When the restriction 2 is complied with, any of the chosen logical units can be extracted.

FIG. 11 is a schematic view presenting a set of nodes which is subordinate to an "and" node and which may be extracted structurally, and FIG. 12 is a schematic view sketching a set of nodes which is subordinate to an "and" node and which cannot be extracted structurally. In the example of FIG. 11 in which generic logical information is made up of document elements "a" and "b" connected by a constructor "and" (a&b), the restriction 3 is met. Since the document elements "a" and "b" are different types, each of the elements may be extracted as a tree structure. If the generic logical information is composed of document elements "a" and "b" connected by a constructor "and," the element "b" being allowed to recur by a constructor "plus" (a&b+) as depicted in FIG. 12, then the restriction 3 is not met. This is due to the recurrence of the document element "b." In other words, the presence of a plurality of document elements "b" in a document prevents the "b+" part from getting extracted as a tree structure. The "and" node represents a permutation of logical units, and each of the nodes constituting the subordinate string represents a logical unit. When the restriction 3 is complied with, any of the logical units in the permutation can be extracted.

FIG. 13 is a schematic view portraying a node which is subordinate to a "plus" node and which may be extracted structurally, and FIG. 14 is a schematic view picturing a set of nodes which is subordinate to a "plus" node and which cannot be extracted structurally. In the example of FIG. 13 in which generic logical information is made up of a document element "a" being allowed to recur (a+), the restriction 4 is met. Since the document element "a" is a single type, it may be extracted as a tree structure. If the generic logical information is composed of document elements "a" and "b" connected by a constructor "seq," the elements "a" and "b" being allowed to recur ((a, b)+) as depicted in FIG. 14, then the restriction 4 is not met.

When a document is made up of a plurality of [strings of elements "a" and "b"], it is impossible to extract a string of elements "a" and "b" as a logical-unit tree structure. The "plus" node represents a repetition of logical units, and each of the subordinate nodes represents a logical unit. When the restriction 4 is complied with, any of the repeated logical units can be extracted.

FIG. 15 is a schematic view showing a node which is subordinate to an "opt" node and which may be extracted structurally, and FIG. 16 is a schematic view depicting a set of nodes which is subordinate to an "opt" node and which cannot be extracted structurally. In the example of FIG. 15 in which generic logical information is made up of a document element "a" allowed to occur once or not to occur at all (a?), the restriction 5 is met. Since the document element "a" is a single type, it may be extracted as a tree structure. If the generic logical information is composed of document elements "a" and "b" connected by a constructor "seq," the elements "a" and "b" (a, b) being allowed to occur once or not to occur at all ((a, b)?) as depicted in FIG. 16, then the restriction 5 is not met.

When a document is made up of a string of document elements "a" and "b," it is impossible to extract that string of elements "a" and "b" as a logical-unit tree structure. The "opt" node represents the possibility of omission in increments of the logical unit, and each of the subordinate nodes represents a logical unit. When the restriction 5 is complied with, any of the logical units not omitted can be extracted.

As described, meeting the five restrictions allows a logical unit to be extracted as a tree structure from the desired document. Thus while the document generic logical information is being edited, the restriction compliance judging process (FIG. 5) judges whether each of the five restrictions is complied with every time an editing operation is carried out.

During the restriction compliance judging process of FIG. 5, a check is also made to see if another restriction, "Subordinate to a type must be a single constructor only" besides the five restrictions, is complied with (steps 605 through 608). A graph structure meeting the sixth restriction not only allows a logical unit to be extracted as a tree structure from a document but also causes the document logical information about that document to be always interpreted uniquely.

When the restrictions are limited to those enabling beforehand "connective relations above and below a constructor," it is possible not only to extract a logical unit as a tree structure from a document but also to interpret uniquely the extracted logical unit of the document. For this reason, the restriction compliance judging process (FIG. 5) judges whether these restrictions are complied with so that the document generic logical information regarding any particular document will be uniquely interpreted.

To add the sixth restriction, "Subordinate to a type must be a single constructor only" to the five preceding restrictions requires that the following three conditions be found to be met by the restriction compliance judging process:

Condition "a": Subordinate to a node "seq," "or" or "and" must be a string of mutually different types only.

Condition "b": Subordinate to a node "plus" or "opt" must be a single type only.

Condition "c": Subordinate to a type must be a single constructor only.

Where the restrictions including the above three conditions are found to be met, there may be only one constructor subordinate to any type (condition "c"). This makes it possible for any one of the nodes "seq," "or," "and," "plus" and "opt" to be interpreted uniquely. That is, subordinate to any of the nodes "seq," "or" and "and" is a string of mutually different types (condition "a"), which obviously permits unique interpretation. Below the node "plus" or "opt" must be a single type only (condition "b"), which also permits unique interpretation. Thus under these conditions, the interpretation of a given document is always unique.

As described, the document generic logical information editing apparatus embodying the invention allows individual restriction compliance checks to be made during editing of the document generic logical information. The restriction compliance judging process is performed when each of the nodes or elements constituting the graph structure data is edited. As a result, the whole graph structure is composed only of type nodes meeting the restrictions discussed above. From any documents based on the document generic logical information thus edited, a logical group of document elements may be extracted as a tree structure. Where the restrictions are complied with, the interpretation of the document logical information regarding each specific document is always unique.

A variation of the above-described embodiment will now be described. The above embodiment has its restriction compliance judging process carried out during editing of each of the nodes or elements constituting the graph structure data, and the editing of each node is either validated or invalidated depending on the result of the compliance check. Alternatively, the restriction compliance judging process may be performed collectively after all nodes have been edited. The alternative allows individual nodes to be edited more efficiently.

FIG. 18 is an overall flowchart of editing steps in which the first variation of the embodiment works. The first variation of the embodiment has its restriction compliance judging process carried out not during the addition, changing or erasure of nodes by the respective subroutines but during the editing process by the main routine. Thus the restriction compliance judging process is executed on the type nodes regarding the edited result.

How the first variation of the embodiment edits document generic logical information will now be outlined with reference to FIG. 18. With the editing process started, step 101 is first reached in which a check is made to see if document generic logical information is prepared anew. If the check in step 101 shows that new document generic logical information need not be prepared, the preserved data is retrieved from the holding device in step 102. If the check in step 101 shows that document generic logical information needs to be prepared anew, step 103 is reached. In step 103, a graph composed of one node is created.

In step 104, a check is made to see if the command for editing the document generic logical information is "Select." If the command is found to be "Select," step 105 is reached. In step 105, the node is selected. Step 105 is followed by step 117 in which a check is made to see if the command then received specifies that the editing process is to continue. If the editing process is allowed to continue, step 104 is reached again and the process is repeated from there.

If the command for editing the document generic logical information is not found to be "Select" in step 104, step 106 is reached. In step 106, a copy is made of the original state (graph structure data). In step 107, a check is made to see if the edit command is "Add." If the command is found to be "Add," step 108 is reached in which the node is added. Step 108 is followed by step 113.

If the command for editing the document generic logical information is not found to be "Add" in step 107, step 109 is reached. In step 109, a check is made to see if the edit command is "Change." If the command is found to be "Change," step 110 is reached in which the node is changed. Step 110 is followed by step 113. If the edit command is not found to be "Change" in step 109, step 111 is reached. In step 111, a check is made to see if the edit command is "Erase." If the command is found to be "Erase," step 112 is reached in which the node is erased. Step 112 is followed by step 113.

In step 113, the process of judging restriction compliance is carried out. In step 114, the result of the restriction compliance judging process is verified. If the result in step 114 shows that the graph structure prepared by the editing process of adding the node (step 108), changing the node (step 110) or erasing the node (step 112) fails to meet the restrictions in force, step 115 is reached. In step 115, the copy of the original state (graph structure data) is restored so as to invalidate the node editing process in question. If the result in step 114 shows that the edited graph structure complies with the restrictions, step 116 is reached. In step 116, the editing process in question is validated and the copy of the original state (graph structure data) is discarded. Step 116 is followed by step 117.

If the check in step 111 fails to verify that the edit command is "Erase," step 117 is reached immediately thereafter. In step 117, a check is made to see if the command then received specifies that the editing process is to continue. If the editing process is allowed to continue, step 104 is reached again and the process is repeated from there.

If the check in step 117 finds that the command then received specifies that the editing process is to discontinue, step 118 is reached. In step 118, a check is made to see if the command then received specifies that the result of the editing process so far is to be preserved. If the result of the editing process is not to be preserved, step 119 is reached. In step 119, the currently edited data in the state retaining device is discarded. If the command allows the result of the editing process to be preserved, step 120 is reached in which the currently edited data is preserved in the state retaining device.

In step 121, a check is made to see if the editing of the document generic logical information has come to an end. If the end has yet to be reached, step 101 is reached again and the process is repeated from there. If the editing of the document generic logical information is found to be terminated in step 121, the whole process comes to an end.

In the manner described, the document generic logical information is prepared anew, selected, added to, changed, erased, continued, preserved or ended as instructed (by edit commands) while being edited. The result of the editing process is subjected to the restriction compliance judging process to see if the edited result is valid.

FIG. 19 is an overall flowchart of editing steps in which a second variation of the embodiment works. The second variation of the embodiment has its restriction compliance judging process carried out when the editing process is terminated. Thus all type nodes are checked for compliance with the restrictions in force.

How the second variation of the embodiment edits document generic logical information will now be outlined with reference to FIG. 19. With the editing process started, step 201 is first reached in which a check is made to see if document generic logical information is prepared anew. If the check in step 201 shows that new document generic logical information need not be prepared, the preserved data is retrieved from the holding device in step 202. If the check in step 201 shows that document generic logical information needs to be prepared anew, step 203 is reached. In step 203, a graph composed of one node is created.

In step 204, a check is made to see if the command for editing the document generic logical information is "Select." If the command is found to be "Select," step 205 is reached. In step 205, the node is selected. Step 205 is followed by step 212 in which a check is made to see if the command then received specifies that the editing process is to continue. If the editing process is allowed to continue, step 204 is reached again and the process is repeated from there.

If the command for editing the document generic logical information is not found to be "Select" in step 204, step 206 is reached. In step 206, a check is made to see if the edit command is "Add." If the command is found to be "Add," step 207 is reached in which the node is added. Step 207 is followed by step 212. In step 212, a check is made to see if the command then received specifies that the editing process is to continue. If the editing process is allowed to continue, step 204 is reached again and the process is repeated from there.

If the command for editing the document generic logical information is not found to be "Add" in step 206, step 208 is reached. In step 208, a check is made to see if the edit command is "Change." If the command is found to be "Change," step 209 is reached in which the node is changed. Step 209 is followed by step 212. If the edit command is not found to be "Change" in step 208, step 210 is reached. In step 210, a check is made to see if the edit command is "Erase." If the command is found to be "Erase," step 211 is reached in which the node is erased. Step 211 is followed by step 212. In step 212, a check is made to see if the command then received specifies that the editing process is to continue. If the editing process is allowed to continue, step 204 is reached again and the process is repeated from there.

In the manner described, the node editing process ranging from step 204 to step 212 is repeated without the restriction compliance judging process being carried out. If the check in step 212 shows that the command then received specifies that the editing process is to discontinue, step 213 is reached. In step 213, a check is made to see if the command then received specifies that the result of the editing process so far is to be preserved. If the result of the editing process is not to be preserved, step 221 is reached. In step 221, the currently edited data in the state retaining device is discarded.

If the check in step 213 shows that the command allows the result of the editing process to be preserved, step 214 is reached. Between step 214 and step 220, all nodes are checked for compliance with the restrictions in force. In step 214, one node type of the graph structure data is extracted. In step 215, the type is checked for compliance with the restrictions. In step 216, a check is made to see if the type complies with the restrictions. If the restrictions are not met, the result of the editing process cannot be preserved and step 217 is reached. In step 217, the type that failed to meet the restrictions is presented to the user. Step 217 is followed by step 221 in which the currently edited data in the state retaining device is discarded. Step 221 is followed by step 222.

If the check in step 216 shows that the type complies with the restrictions in force, step 218 is reached. In step 218, a check is made to see if there still exist any types yet to be checked for compliance with the restrictions. If there exist such types, step 219 is reached in which the next node type of the graph structure data is extracted. After step 219, step 215 is reached again and the restriction compliance judging process is repeated from there. When the unchecked types have been exhausted, the absence of such types is ascertained in step 218. Step 218 is followed by step 220 in which the currently edited data in the state retaining device is preserved. Step 220 is followed by step 222.

In step 222, a check is made to see if the editing of the document generic logical information has come to an end. If the end has yet to be reached, step 201 is reached again and the process is repeated from there. If the editing of the document generic logical information is found to be terminated in step 222, the whole process comes to an end.

In the manner described, the document generic logical information is prepared anew, selected, added to, changed, erased, continued, preserved or ended as instructed (by edit commands) while being edited. Where the result of the editing process is desired to be preserved, all nodes are subjected to the restriction compliance judging process to see if the edited result is valid. The result of the editing process is preserved only if what was edited was found to be valid.

A variation of the judging device 14 will now be described. The restriction compliance judging process performed by the judging device 14 creates a basic finite automaton in accordance with the document generic logical information in effect. Compliance of the basic finite automaton with each of the restrictions is checked by verifying whether the path of node acceptance of the automaton is unique. When the edited document generic logical information is checked by the basic finite automaton for compliance with each of the restrictions in effect, the restriction compliance judging process is executed at high speed. Then each of the documents created on the basis of the document generic logical information has its logical structure always interpreted uniquely.

FIG. 20 is an overall flowchart of the judging device variation of the embodiment executing the process of checking to see if the restrictions are met, and FIG. 21 is a flowchart of the process of creating a basic finite automaton during the processing of FIG. 20. FIGS. 22 through 27 are schematic views illustrating how various finite automatons are created. FIG. 28 is a flowchart showing how the path of acceptance of a basic finite automaton is judged to be unique or not. FIGS. 29 through 34 are state transition diagrams of finite automatons each created by the process of judging whether or not its path of acceptance is unique.

Referring to FIG. 20, the restriction compliance judging process first requires a basic finite automaton to be created (step 621). That step is followed by a check on whether the path of acceptance is unique (step 622). When the path of acceptance is found to be always unique (step 623), the restrictions are deemed complied with (step 624). If the path of acceptance is not always found to be unique, the restrictions are not deemed met (step 625).

Whether or not a particular document is interpreted always uniquely is checked as follows: first a finite automaton is created which can accept a list of possible types which are structurally above the selected node and are subordinate to the closest type node. Then a check is made to see if the finite automaton in question has a plurality of node acceptance paths. Methods for constructing such finite automatons and more details thereof are discussed illustratively by Akio Fukumura and Yasuyoshi Inagaki in their book, "Automatons: Theory of Formal Languages and Theory of Computation" (from Iwanami Publishing Co., Ltd., Japan).

The process of creating a basic finite automaton (step 621) is accomplished by executing the steps constituting the process of FIG. 21. Specifically, a basic finite automaton accepting a list of types that are connectable below each of the nodes making up a graph structure is produced as follows:

Referring to FIG. 21, starting the process first causes step 631 to be reached. In step 631, a check is made to see if the node in question is a type node. If the target node is found to be a type node, step 632 is reached. In step 632, a finite automaton for accepting that type alone is created. The process is then terminated and control is returned.

If the node in question is not found to be a type node in step 631, the node is deemed a constructor node and step 633 is reached. In step 633, one subordinate node is extracted. In step 634, a check is made to see if the extracted node is an "opt" node. If the extracted node is found to be an "opt" node, it means there exist a plurality of more subordinate nodes and thus step 635 is reached. In step 635, the process for creating a basic finite automaton is called recursively. Upon returning from the recursive call of the basic finite automaton creating process, step 636 is reached in which an ε transition from the initial state to the final state is added. The process is then terminated and control is returned.

If the extracted node is not found to be an "opt" node in step 634, step 636 is reached. In step 636, a check is made to see if the extracted node is a "plus" node. If the extracted node is found to be a "plus" node, it means there exist a plurality of more subordinate nodes and thus step 637 is reached. In step 637, the process for creating a basic finite automaton is called recursively. Upon returning from the recursive call of the basic finite automaton creating process, step 638 is reached in which an ε transition from the final state to the initial state is added. The process is then terminated and control is returned.

If the extracted node is not found to be a "plus" node in step 636, it means there exist a plurality of more subordinate nodes and thus step 639 is reached. In step 639, the process for creating a basic finite automaton is called recursively. Upon returning from the recursive call of the basic finite automaton creating process, step 640 is reached in which a check is made to see if there exist more subordinate nodes. If more subordinate nodes are found to exist in step 640, step 641 is reached in which the next lower node is extracted. Step 641 is followed by step 639 and the process is repeated from there.

If no further subordinate nodes are found to exist in step 640, step 642 is reached. In step 642, a check is made to see if the extracted node is a "seq" node. If the node is found to be a "seq" node, step 643 is reached in which a serially connected finite automaton is created. The process is then terminated and control is returned. If the extracted node is not found to be a "seq" node in step 642, step 644 is reached. In step 644, a check is made to see if the extracted node is an "or" node. If the node is found to be an "or" node, step 645 is reached in which a parallelly connected finite automaton is created. The process is then terminated and control is returned.

If the extracted node is not found to be an "or" node in step 644, step 646 is reached. In step 646, a check is made to see if the extracted node is an "and" node. If the node is found to be an "and" node, step 647 is reached. In step 647, finite automatons each accepting each of all permutations are created, and these finite automatons are connected parallelly to create another finite automaton. The process is then terminated and control is returned. If the extracted node is not found to be an "and" node in step 646, the process is terminated and control is returned.

As a result of the finite automaton creating process above, the node in question may be found to be a type which is illustratively a "title." In that case, as shown in FIG. 22, an automaton accepting only a "title" node is created.

If the node in question is an "opt(X)" node, the basic finite automaton creating process is called recursively to create a finite automaton 230 accepting X, as shown in FIG. 23. Then a finite automaton is created with an (unconditional) ε transition from the initial state to the final state added thereto.

Likewise, if the node in question is a "plus(X)" node, the basic finite automaton creating process is called recursively to create a finite automaton 240 accepting X, as depicted in FIG. 24. Thereafter, a finite automaton is created with an ε transition from the final state to the initial state added thereto.

If the node in question is a "seq(X, Y, . . . , Z)" node, the basic finite automaton creating process is called recursively a number of times to create finite automatons 251, 252, . . . , 253 accepting X, Y, . . . , Z, as illustrated in FIG. 25. These finite automatons 251, 252, . . . , 253 are then connected serially using ε transitions to create another finite automaton.

If the node in question is an "or(X, Y, . . . , Z)" node, the basic finite automaton creating process is called recursively a number of times to create finite automatons 261, 262, . . . , 263 accepting X, Y, . . . , Z, as sketched in FIG. 26. These finite automatons 261, 262, . . . , 263 are then connected parallelly using ε transitions to create another finite automaton.

If the node in question is an "and(X, Y, . . .)" node, the basic finite automaton creating process is called recursively a number of times to create finite automatons 271, 272, 273 accepting each of all permutations X, Y, . . . , as shown in FIG. 27. That is, the finite automaton 271 accepting "seq(X, Y, . . .)" is created first, followed by the finite automaton 271 accepting "seq(Y, X, . . .), and so on. These finite automatons 271, 272, 273 are then connected parallelly using ε transitions to create another finite automaton.

How the process of judging whether the path of acceptance is unique (step 622) will now be described with reference to FIG. 28. The judging process checks to see if the finite automaton created in the preceding process has an input involving a plurality of acceptance paths. The process involved will be described below using symbols adopted in "Automatons; Theory of Formal Languages and Theory of Computation" (ibid.).

The finite automaton acting as the basic operative element of the process is called a basic finite automaton M expressed as M=(Q, Σ, δ, q0, F)

When the process is started, four basic finite automatons are created first to carry out a judging process. The automaton creating process is started by having two different states (s1, s2 ∈ Q) selected suitably from Q (step 701).

Four finite automatons (F1, F2, B1, B2) necessary for the judging process are copied from the basic finite automaton M. Then one copied basic finite automaton M has its current final state replaced by the state 1 (s1), to become a finite automaton F1 expressed as F1=(Q, Σ, δ, q0, {s1})

Another copied basic finite automaton M has its final state replaced by the state 2 (s2), to become a finite automaton F2 expressed as F2=(Q, Σ, δ, q0, {s2})

Likewise, another copied basic finite automaton M has its current initial state replaced by the state 1, to become a finite automaton B1 expressed as B1=(Q, Σ, δ, s1, F)

Another copied basic finite automaton M has its initial state replaced by the state 2, to become a finite automaton B2 expressed as B2=(Q, Σ, δ, s2, F)

The operations above occur in steps 702 through 708.

Another automaton F is created which will accept the product of the language accepted by the automaton F1 and of the language accepted by the automaton F2 (step 709). Also an automaton B is created which will accept the product of the language accepted by the automaton B1 and of the language accepted by the automaton B2 (step 710). A check is made to see if the language L(F) accepted by the automaton F is empty and if the language L(B) accepted by the automaton B is also empty (step 711).

The methods for creating automatons for accepting products and ways to judge whether the accepted languages are empty are described illustratively in "Automatons: Theory of Formal Languages and Theory of Computation" (ibid.).

Where neither the language L(F) accepted by the automaton F nor the language L(B) accepted by the automaton B is empty, the elements (sentences) of the languages L(F) and L(B) are extracted one by one and labeled $f_1, f_2, \ldots, f_n$, and $b_1, b_2, \ldots, b_m$. In that case, the elements $f_1, f_2, \ldots, f_n$ are accepted by the two automatons F1 and F2, while the elements $b_1, b_2, \ldots, b_m$ are accepted by the automatons B1 and B2. Thus the sentences $f_1, f_2, \ldots, f_n, b_1, b_2, \ldots, b_m$ when connected have an acceptance path leading from the initial state through the state 1 to the final state, as well as another acceptance path leading from the initial state through the state 2 to the final state. Therefore the finite automaton in question is judged to have the input $f_1, f_2, \ldots, f_n, b_1, b_2, \ldots, b_m$ involving a plurality of acceptance paths. In this case, the acceptance paths are always judged not unique (step 712).

In the judging process, all input combinations are tried until the combinations including the input states 1 and 2 involving a plurality of acceptance paths are detected (steps 713 to 714). If none of these combinations is detected, it means the acceptance path is unique; otherwise the path is not unique (step 712).

Specific finite automatons created by the process of judging whether the path of acceptance is unique will now be described with reference to FIGS. 29 through 34. A finite automaton is expressed by a set of a finite number of states and by a set of state transitions represented by input symbols. There exists only one destination following a transition from a given state (the destination may be the same as the preceding state). One of the states is the initial state, usually identified as q0, from which the finite automaton starts operating. A number of states are designated as the final state each. When each of symbols making up an input symbol string "x" produces a string of consecutively occurring state transitions leading from the initial state to the last state of the finite automaton M, the finite automaton M is said to have accepted the input symbols, and the string of states leading up to the acceptance is called a path of acceptance.

The state transition diagram is a graphical representation of a finite automaton in directed graph format. Each of the vertices in the graph corresponds to each of the states of the finite automaton. Illustratively, if there is a transition "a" from a state "p" to a state "q," then a directed side labeled "a" and ranging from a vertex "p" to a vertex "q" is written in the graph. The final state is enclosed with a double circle.

FIG. 29 is a state transition diagram of a finite automaton accepting a string of type nodes immediately below a node "summary report." If the label is a type node and if a string of type nodes is an input symbol string, it is clear that this finite automaton accepts correctly a string of type nodes immediately subordinate to the node "summary report." A finite automaton model modified to expand from one state to zero, one or more states using the same input symbol is called a nondeterministic automaton. A nondeterministic finite automaton expanded to permit state transitions through empty inputs ε is called a nondeterministic finite automaton including ε actions.

FIG. 30 is a state transition diagram of a nondeterministic finite automaton including ε actions for accepting a string of type nodes immediately below a node "history." Illustratively, an input symbol string "date, updater, date, date" is accepted by the finite automaton of FIG. 30 through the path comprising the state transitions "q0—(date)→q1—(updater)→q2—(date)→q3—(ε transition)→q2—(date)→q3," in that order. In this acceptance path, the transition from the state q3 to the state q2 is the ε transition but is not explicitly indicated by an ε empty string in the input symbol string.

This kind of nondeterministic finite automaton comprising ε actions is also created by the finite automaton creating process discussed above. Where the node is a type, making that type "title" creates an automaton which accepts only the "title" node (see FIG. 22). Where the node is an "opt(X)" node, a finite automaton accepting X is created first, followed by a finite automaton with an ε transition from the initial state to the final state added thereto (FIG. 23).

Where the node is a "plus(X)" node, a finite automaton accepting "X" is created first, followed by a finite automaton with an ε transition from the final state to the last state added thereto (FIG. 24). Where the node is a "seq(X, Y, . . .)" node, finite automatons accepting X, Y, . . . each are created first, followed by a finite automaton produced by serially connecting these automatons (FIG. 25). Where the node is an "or(X, Y, . . .)" node, finite automatons accepting X, Y, . . . each are created first, followed by a finite automaton produced by parallelly connecting these automatons (FIG. 26). Where the node is an "and(X, Y, . . .)" node, finite automatons each accepting each of all permutations X, Y, . . . are created first, followed by a finite automaton produced by parallelly connecting these automatons (FIG. 27).

The above-mentioned finite automaton accepting the "summary report" node is also created likewise. That is, a basic finite automaton is created first by use of the finite automaton creating process. Then two states, between which only an ε transition may occur, are combined into one regarding the automaton.

When a finite automaton created in the above manner accepts an input symbol string through a certain path of acceptance, that path provides the interpretation of the document in question. Thus whether the interpretation of a specific document is always unique is judged by checking to see if that document (i.e., input symbol string) has a plurality of acceptance paths. For example, the two interpretations of the input symbol string "date, date" regarding the document element "history" of the document "summary report" correspond to two paths: "q0—(date)→q1—(ε transition)→q2—(date)→q3" on the one hand, and "q0—(ε transition)→q1—(ε transition)→q2—(date)→q3—(ε transition)→q2—(date)→q3" on the other.

Whether the above finite automaton has an input involving a plurality of acceptance paths is judged by the process of judging whether the path of acceptance is unique, illustrated in FIG. 28. Specifically, four finite automatons are first created as shown in FIGS. 31 through 34. These four finite automatons are used to judge the path for uniqueness. First, a finite automaton M is created. From the states possessed by the automaton M, two different states s1 and s2 are selected. The selected states are used to create the four finite automatons as follows;

F1: a finite automaton having the state s1 as the new final state to replace all current final states of the automaton M F2: a finite automaton having the state s2 as the new final state to replace all current final states of the automaton M B1: a finite automaton having the state s1 replacing the initial state of the automaton M B2: a finite automaton having the state s2 replacing the initial state of the automaton M These four finite automatons F1, F2, B1 and B2 turn out to be those shown respectively in FIGS. 31, 32, 33 and 34 if they are based illustratively on the automaton of FIG. 30 where s1=q1 and s2=q3. In the case above, the finite automaton for accepting the product of the language accepted by the automaton F1 and of the language accepted by the automaton F2 is labeled F, and the finite automaton for accepting the product of the language accepted by the automaton B1 and of the language accepted by the automaton B2 is labeled B.

A check is then made to see if the languages accepted by the automatons F and B are empty. That is, the combinations involving the states s1 and s2 are changed successively, and the check on these combinations is repeated until a combination is detected which would include the states s1 and s2 wherein the languages accepted by the two automatons F and B are not empty. In that case, if the finite automaton M is assumed to have "n" states, there exist n×(n−1) combinations of the states s1 and s2. It follows that there are at most n×(n−1) checks to be carried out. If the judging process detects no combination of the states s1 and s2, the acceptance path is judged to be unique. Otherwise the path is deemed not unique.

What takes place above is the process of detecting a combination of the states s1 and s2 wherein the languages accepted by the two automatons F and B are not empty. Explained below is the fact that detecting a combination of the states s1 and s2 is equivalent to detecting the presence of an input symbol string involving a plurality of acceptance paths of the finite automaton M. If neither the language accepted by the automaton F nor the language accepted by the automaton B is empty, the symbols of the input symbol strings accepted by the respective automatons are enumerated suitably as $f_1, f_2, \ldots, f_n$, and $b_1, b_2, \ldots, b_m$. In that case, because the input symbol string $f_1, f_2, \ldots, f_n$ is accepted by the two automatons F1 and F2, the state s1 is reached with the automaton M when the acceptance path of the automaton F1 is followed, as shown in FIG. 31; the state s2 is reached when the acceptance path of the automaton F2 is followed, as depicted in FIG. 32.

Likewise, because the input symbol string $b_1, b_2, \ldots, b_m$ is also accepted by the two automatons B1 and B2, the final state is reached with the automaton M when the acceptance path is followed starting from the state s1 with the automaton B1; the final state is also reached when the accepting path is followed starting from the state s2 with the automaton B2. Thus the input symbol strings $f_1, f_2, \ldots, f_n$ and $b_1, b_2, \ldots, b_m$ have one acceptance path leading from the initial state through the state s1 up to the final state for the automaton M, and another acceptance path leading from the initial state through the state s2 up to the final state. In other words, the automaton M has an input involving a plurality of acceptance paths ($f_1, f_2, \ldots, f_n$ and $b_1, b_2, \ldots, b_m$).

What follows is another specific example in which, as before, s1=q1 and s2=q3 for the input symbol string "date, date" regarding the document element "history" of the above-mentioned document "summary report." The "date" is accepted by the automaton F1 through a path, "q0—(date)→q1," and by the automaton F2 through another path, "q3—(ε transition)→q2—(date)→q3." Thus the "date" provides an input symbol string which is accepted by the automaton F and which is to be extracted. In this case, n=1 and $f_1, f_2, \ldots, f_n = f_1 =$"date."

The "date" is also accepted by the automaton B1 through a path, "q1—(ε transition)→q2—(date)→q3," and by the automaton B2 through another path, "q3—(ε transition)→q2—(date)→q3." Thus the "date" provides another input symbol string which is accepted by the automaton B and which is to be extracted. In this case, m=1 and $b_1, b_2, \ldots, b_m = b_1 =$"date." Thus the automaton M has the input symbol string "date, date" involving two different acceptance paths, and the input symbol string is not unique in interpretation.

As described, the document generic logical information editing apparatus according to the invention prepares document generic logical information allowing any logical unit of structured documents to be extracted as a tree structure. This makes it easy to designate the automatic editing process on a given document prepared according to the logical information while eliminating procedures for transmitting or removing unnecessary data in connection with the process. The users' chores associated with extra tasks of such data handling are thus alleviated. Furthermore, the inventive apparatus supports the editing of only that kind of document generic logical information whereby any one of structured documents is always given a unique meaning when interpreted. This makes it easy to describe inquiries about and designate automatic editing of suitably structured documents, thereby reducing operative burdens on the user' part.

As many apparently different embodiments of this invention may be made without departing from the spirit and scope thereof, it is to be understood that the invention is not limited to the specific embodiments thereof except as defined in the appended claims.

What is claimed is:

1. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types, wherein, when one of the nodes in the graph structure represented by the generic logical information is a first constructor node that allows all type nodes next subordinate to said constructor node to occur in a specified sequence in the at least one document; and judging means for judging, upon editing of said document generic logical information by the editing means whether said document generic logical information meets restrictions on at least either the kinds or a number of the subordinate nodes in the graph structure, so that only a desired part of the at least one document will be extracted, said judging means further judges whether the graph structure represented by the document generic logical information meets the restriction ensuring that elements of the at least one document having a logical structure corresponding to the document generic logical structure is always interpreted uniquely, said judging means further judges whether kinds of the type nodes next subordinate to said first constructor node in the graph structure are all different.

2. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types, wherein, when one of the nodes in the graph structure represented by the document generic logical information is a first constructor node that allows only one of a plurality of type nodes next subordinate to the first constructor node in the graph structure to occur as an element in the at least one document; and judging means for judging, upon editing of said document generic logical information by the editing means whether said document generic logical information meets restrictions on at least either the kinds or a number of the subordinate nodes in the graph structure, so that only a desired part of the at least one document will be extracted, said judging means further judges whether the graph structure represented by the document generic logical information meets the restriction ensuring that elements of the at least one document having a logical structure corresponding to the document generic logical structure is always interpreted uniquely, said judging means further judges whether kinds of the type nodes next subordinate to said first constructor node in the graph structure are all different.

3. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types, wherein, when one of the nodes in the graph structure represented by the document generic logical information represents a first constructor node allowing all nodes next subordinate to the first constructor node in the graph structure to occur in any sequence in the at least one document; and judging means for judging, upon editing of said document generic logical information by the editing means whether said document generic logical information meets restrictions on at least either the kinds or a number of the subordinate nodes in the graph structure, so that only a desired part of the at least one document will be extracted, said judging means further judges whether the graph structure represented by the document generic logical information meets the restriction ensuring that elements of the at least one document having a logical structure corresponding to the document generic logical structure is always interpreted uniquely, said judging means further judges whether kinds of the type nodes next subordinate to said first constructor node are all different.

4. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types, wherein, when one of the nodes in the graph structure represented by the document generic logical information represents a first constructor node allowing any next subordinate type node to occur at least once in the at least one document; and judging means for judging, upon editing of said document generic logical information by the editing means whether said document generic logical information meets restrictions on at least either the kinds or a number of the subordinate nodes in the graph structure, so that only a desired part of the at least one document will be extracted, said judging means further judges whether the graph structure represented by the document generic logical information meets the restriction ensuring that elements of the at least one document having a logical structure corresponding to the document generic logical structure is always interpreted uniquely, said judging means further judges whether there is only one type node next subordinate to said first constructor node in the graph structure.

5. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types, wherein, when one of the nodes in the graph structure represented by the document generic logical information represents a first constructor node allowing any next subordinate type node to occur at most once in the at least one document; and judging means for judging, upon editing of said document generic logical information by the editing means whether said document generic logical information meets restrictions on at least either the kinds or a number of the subordinate nodes in the graph structure, so that only a desired part of the at least one document will be extracted said Judging means further judges whether the graph structure represented by the document generic logical information meets the restriction ensuring that elements of the at least one document having a logical structure corresponding to the document generic logical structure is always interpreted uniquely, said judging means further judges whether there is only one type node next subordinate to said first constructor node.

6. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types, wherein, when one of the nodes in the graph structure represented by the document generic logical information represents a type node; and judging means for judging, upon editing of said document generic logical information by the editing means whether said document generic logical information meets restrictions on at least either the kinds or a number of the subordinate nodes in the graph structure, so that only a desired part of the at least one document will be extracted, said judging means further judges whether the graph structure represented by the document generic logical information meets the restriction ensuring that elements of the at least one document having a logical structure corresponding to the document generic logical structure is always interpreted uniquely, said judging means further judges whether there is at most one constructor node immediately subordinate to said type node in the graph structure.

7. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, and said constructors represent relations between said types; and judging means for judging, upon editing of said document generic logical information by the editing means whether said document generic logical information meets restrictions on at least either the kinds or a number of the subordinate nodes in the graph structure, so that only a desired part of the at least one document will be extracted, said judging means further judges whether the graph structure represented by the generic logical information meets the restriction ensuring that any substructure of the at least one document can be extracted as a tree structure, the substructure of the at least one document corresponding to the document generic logical information and constituting a logical unit, said judging means further judges, when a constructor node in the graph structure represented by the document generic logical information is one of a first constructor node designating that all type nodes next subordinate to the first constructor node are allowed to occur in a specified sequence in the at least one document, a second constructor node for designating that only one of a plurality of type nodes next subordinate to the second constructor node is allowed to occur in the at least one document, and a third constructor node for allowing all type nodes next subordinate to the third constructor node to occur in the at least one document in any sequence, whether kinds of all type nodes next subordinate to the constructor node in the graph structure are different, and said judging means further judges, when the constructor node in the graph structure represented by the document generic logical information is one of a fourth constructor node for allowing any next subordinate type node to occur at least once in the at least one document and a fifth constructor node for allowing any next subordinate type node to occur at most once in the at least one document, whether there is only one kind of type node next subordinate to the constructor node in the graph structure.

8. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types; and judging means for judging, upon editing of said document generic logical information by the editing means whether said document generic logical information meets restrictions on at least either the kinds or a number of the subordinate nodes in the graph structure, so that only a desired part of the at least one document will be extracted said judging means further judges whether the graph structure represented by the document generic logical information meets the restriction ensuring that elements of the at least one document having a logical structure corresponding to the document generic logical structure is always interpreted uniquely, said judging means further judges, when a constructor node in the graph structure represented by the document generic logical information is one of a first constructor node for designating that all type nodes next subordinate to said first constructor node in the graph structure are allowed to occur in a specified sequence in the at least one document, a second constructor node for designating that only one of a plurality of type nodes next subordinate to the second constructor node in the graph structure is allowed to occur in the at least one document, and a third constructor node for allowing all type nodes next subordinate to the third constructor node in the graph structure to occur in the at least one document in any sequence, whether all type nodes next subordinate to the constructor node in the graph structure represented by the document generic logical information are different, said judging means further judges, when a constructor node in the graph structure represented by the document generic logical information is one of a fourth constructor node for allowing any next subordinate type node to occur at least once in the at least one document and a fifth constructor node for allowing any next subordinate type node in the graph structure to occur at most once in the at least one document, whether there is only one kind of type node next subordinate to the constructor node in the graph structure represented by the document generic logical information, and said judging means further judges whether there is only one constructor node immediately subordinate to a type node in the graph structure represented by the document generic logical information.

9. A document generic logical information editing apparatus according to claim 8, further comprising automaton creating means for creating a basic finite automaton in accordance with said document generic logical information;

wherein said judging means judges whether a path of acceptance of the basic finite automaton created by said automaton creating means is unique, elements of the at least one document having a logical structure corresponding to the document generic logical structure is always interpreted uniquely.

10. A document generic logical information editing apparatus according to claim 9, wherein:

when a node in question in the graph structure represented by the document generic logical information is a type node, said automaton creating means creates a finite automaton for accepting only the type of the node in question;

when the node in question is a constructor node designating that all type nodes next subordinate thereto are allowed to occur in a specified sequence, said automaton creating means creates a finite automaton formed by serially connecting through $\epsilon$ transitions finite automatons each accepting one of the type nodes next subordinate to said constructor node;

when the node in question is a constructor node designating that only one of a plurality of type nodes next subordinate to the constructor node in the graph structure is allowed to occur in the at least one document, said automaton creating means creates a finite automaton formed by parallelly connecting through $\epsilon$ transitions finite automatons each accepting one of the type nodes next subordinate to said constructor node;

when the node in question is a constructor node allowing all type nodes next subordinate to the constructor node to occur in the at least one document in any sequence, said automaton creating means creates finite automatons for accepting each permutation of the type nodes next subordinate to said constructor, said automaton creating means further creating a finite automaton formed by parallelly connecting through $\epsilon$ transitions said finite automatons created for the respective permutations;

when the node in question is a constructor node in the graph structure allowing any next subordinate type node to occur at most once in the at least one document, said automaton creating means creates a finite automaton for accepting the type of the type node next subordinate to said constructor node, said automaton creating means further adding to said finite automaton an $\epsilon$ transition from an initial state of the finite automaton to a final state of the finite automaton; and when the node in question is a constructor node in the graph structure allowing any next subordinate type node to occur at least once in the at least one document, said automaton creating means creates a finite automaton for accepting the type of the type node next subordinate to said constructor node in the graph structure, said automaton creating means further adding to said finite automaton an $\epsilon$ transition from a final state of the finite automaton to an initial state of the finite automaton.

11. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, and said constructors represent relations between said types; and judging means for judging, upon editing of said document generic logical information by the editing means whether said document generic logical information meets restrictions on at least either the kinds or a number of the subordinate nodes in the graph structure, so that only a desired part of the at least one document will be extracted, said judging means further judges whether the graph structure represented by the generic logical information meets the restriction ensuring that any substructure of the at least one document can be extracted as a tree structure, the substructure of the at least one document corresponding to the document generic logical information and constituting a logical unit, wherein the judging means further judges at least one of the following judgment:

when one of the nodes in the graph structure represented by the document generic logical information is a first constructor node that allows all type nodes next subordinate to said first constructor node to occur as elements in the at least one document in a sequence specified by the generic logical information, the judging means judges whether kinds of the type nodes next subordinate to said first constructor node in the graph structure are all different, when one of the nodes in the graph structure, represented by the generic logical information is a second constructor node that allows only one of a plurality of type nodes next subordinate to the second constructor node to occur as an element in the at least one document, the judging means judges whether kinds of the type nodes next subordinate to said second constructor node in the graph structure are all different, when one of the nodes in the graph structure represents a third constructor node allowing all of a plurality of type nodes next subordinate to the constructor node in the graph structure to occur as elements in any sequence in the at least one document, the judging means judges whether kinds of the type nodes next subordinate to said third constructor node in the graph structure are all different, when one of the nodes in the graph structure represents a fourth constructor node allowing any next subordinate type node in the graph structure to occur at least once as an element in the at least one document, the judging means judges whether there is only one type node next subordinate to the fourth constructor node in the graph structure, and when one of the nodes in the graph structure represents a fifth constructor node allowing any next subordinate type node in the graph structure to occur at most once as an element in the at least one document, the judging means judges whether there is only one type node next subordinate to the fifth constructor node in the graph structure.

12. A document generic logical information editing apparatus comprising:

generic logical information editing means for editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, and said constructors represent relations between said types; and judging means for judging, upon editing of said document generic logical information by the editing means, wherein said judging means judges, whether said document generic logical information meets restrictions on at least either the kinds or a number of the subordinate nodes in the graph structure, so that only a desired part of the at least one document will be extracted, whether the graph structure represented by the generic logical information meets the restriction ensuring that any substructure of the at least one document can be extracted as a tree structure, the substructure of the at least one document corresponding to the document generic logical information and constituting a logical unit, when one of the nodes in the graph structure represented by the generic logical information is a first constructor node that allows all type nodes next subordinate to said constructor node in the graph structure to occur as elements in the at least one document in a sequence specified by the generic logical information, whether kinds of the type nodes next subordinate to said first constructor node in the graph structure are all different, when one of the nodes in the graph structure representing the graph structure is a second constructor node that allows only one of a plurality of type nodes next subordinate to the constructor node in the graph structure to occur as an element in the at least one document, whether kinds of the type nodes next subordinate to said second constructor node in the graph structure are all different, when one of the nodes in the graph structure represents a third constructor node allowing all of a plurality of type nodes next subordinate to the constructor node in the graph structure to occur as elements in any sequence in the at least one document, whether kinds of the type nodes next subordinate to said third constructor node in the graph structure are all different, when one of the nodes in the graph structure represents a fourth constructor node allowing any next subordinate type node in the graph structure to occur at least once as an element in the at least one document, whether there is only one type node next subordinate to the fourth constructor node in the graph structure, and when one of the nodes in the graph structure represents a fifth constructor node allowing any next subordinate type node in the graph structure either to occur at most once as an element in the at least one document, whether there is only one type node next subordinate to the fifth constructor node in the graph structure.

13. A document generic logical information editing apparatus comprising:

generic logical information editing means of editing document generic logical information, wherein the document generic logical information defines a document generic logical structure, the document generic logical structure comprising a directed sequential graph structure having nodes selected from a group consisting of types and constructors, wherein some of the nodes are subordinate to others of the nodes in the graph structure, said types give logical meaning to elements of at least one document, the at least one document having a logical structure corresponding to the document generic logical structure, said constructors represent relations between said types; and judging means for judging, upon editing of said document generic logical information by the editing means, wherein said judging means judges, whether said document generic logical information meets restrictions on at least either the kinds or a number of the subordinate nodes in the graph structure, so that only a desired part of the at least one document will be extracted, whether the graph structure represented by the document generic logical information meets the restriction ensuring that elements of the at least one document having a logical structure corresponding to the document generic logical structure is always interpreted uniquely, when one of the nodes in the graph structure represented by the generic logical information is a first constructor node that allows all type nodes next subordinate to said constructor node in the graph structure to occur as elements in the at least one document in a sequence specified by the graph structure, whether kinds of the type nodes next subordinate to said first constructor node in the graph structure are all different, when one of the nodes in the graph structure represented by the generic logical information is a second constructor node that allows only one of a plurality of type nodes next subordinate to the constructor node in the graph structure to occur as an element in the at least one document, whether kinds of the type nodes next subordinate to said second constructor node in the graph structure are all different, when one of the nodes in the graph structure represents a third constructor node allowing all of a plurality of type nodes next subordinate to the constructor node in the graph structure to occur as elements in any sequence in the at least one document, whether kinds of the type nodes next subordinate to said third constructor node in the graph structure are all different, when one of the nodes in the graph structure represents a fourth constructor node allowing any next subordinate type node in the graph structure to occur at least once as an element in the at least one document, whether there is only one type node next subordinate to the fourth constructor node in the graph structure, when one of the nodes in the graph structure represents a fifth constructor node allowing any next subordinate type node in the graph structure either to occur at most once as an element in the at least one document, whether there is only one type node next subordinate to the fifth constructor node in the graph structure, and when one of the nodes in the graph structure represents a type node, whether there is at most one constructor node immediately subordinate to said type node.

* * * * *